United States Patent
Xiao et al.

[19]

[11] Patent Number: 6,093,346
[45] Date of Patent: *Jul. 25, 2000

[54] LONG AFTERGLOW SILICATE LUMINESCENT MATERIAL AND ITS MANUFACTURING METHOD

[76] Inventors: Zhiguo Xiao; Zhiqiang Xiao, both of No. 10 Huojulu, Qixianling, Ganjingzi District, Dalian City, Liaoning 116025, China

[*] Notice: This patent issued on a continued prosecution application filed under 37 CFR 1.53(d), and is subject to the twenty year patent term provisions of 35 U.S.C. 154(a)(2).

[21] Appl. No.: 08/997,924

[22] Filed: Dec. 24, 1997

[30] Foreign Application Priority Data

Mar. 26, 1997 [CN] China .................................. 97103524

[51] Int. Cl.[7] ........................... C09K 11/71; C09K 11/59; C09K 11/63
[52] U.S. Cl. ........................... 252/301.4 F; 252/301.6 F; 252/301.4 P; 252/301.6 P
[58] Field of Search ....................... 252/301.9 F, 30.6 F, 252/361.4 P, 301.6 P

[56] References Cited

U.S. PATENT DOCUMENTS

| | | | |
|---|---|---|---|
| 3,505,240 | 4/1970 | Barry | 252/301.4 R |
| 3,544,481 | 12/1970 | Barry | 252/301.4 F |
| 3,651,363 | 3/1972 | Barry | 252/301.4 F |
| 3,676,361 | 7/1972 | Datta | 252/301.4 F |
| 4,127,498 | 11/1978 | Verstegen et al. | 252/301.4 F |
| 5,422,538 | 6/1995 | Ouwerkerk et al. | 313/486 |

FOREIGN PATENT DOCUMENTS

| | | |
|---|---|---|
| 1053807 A | 8/1991 | China . |
| 1032921 C | 10/1996 | China . |
| 50-619178 | 5/1975 | Japan . |
| 52-8994 | 1/1977 | Japan . |
| 54-38682 | 3/1979 | Japan . |
| 58-151322 | 9/1983 | Japan . |
| 58-168683 | 10/1983 | Japan . |
| 61-174291 | 8/1986 | Japan . |
| 1-167394 | 7/1989 | Japan .............................. 252/301.6 F |
| 50-49178 | 5/1995 | Japan . |
| 1222859 | 2/1971 | United Kingdom ............ 252/301.4 F |
| 2 171 112 A | 8/1986 | United Kingdom . |
| WO 93/25630 | 12/1993 | WIPO . |

OTHER PUBLICATIONS

Chemical Abstracts citation 126:110440, Yang et al, "The Luminescence Characteristics of Europium Activated Strontium Silicate Synthesized at High Temperature and High Pressure", J. Mater. Sci. Lett., 15 (21), pp. 1891–1894, 1996 no month.

Chemical Abstract citation 116:30400, Li et al "Synthesis, Structure and Luminescence Properties of Europium and Bismuth–Doped Calcium Silicate (CaSiO3) Luminophor", 1991 no month.

(List continued on next page.)

*Primary Examiner*—C. Melissa Koslow
*Attorney, Agent, or Firm*—Seed Intellectual Property Law Group

[57] ABSTRACT

The long afterglow silicate luminescent materials which main chemical composition formula is: $aMO\text{-}bM'O\text{-}cSiO_2\text{-}dR\text{:}Eu_xLn_y$, wherein M represents one or more elements selected from a group consisting of Sr, Ca, Ba and Zn; M' represents one ore more elements selected from a group consisting of Mg, Cd and Be; R represents one or two components selected from $B_2O_3$ and $P_2O_5$; Ln represents one or more elements selected from a group consisting of Nd, Dy, Ho, Tm, La, Pr, Tb, Ce, Mn, Bi, Sn and Sb; a, b, c, d, x and y are mole coefficients; wherein $0.6 \leq a \leq 6$, $0 \leq b \leq 5$, $1 \leq o \leq 9$, $0 \leq d \leq 0.7$, $0.00001 \leq x \leq 0.2$, and $0 \leq y \leq 0.3$; these luminescent materials have long afterglow characteristic after absorbing short wavelength lights.

9 Claims, 9 Drawing Sheets

OTHER PUBLICATIONS

Barry, "Equilibria and $Eu^{2+}$ Luminescence of Subsolidus Phases Bounded by $Ba_3MgSi_2O_8$, $Sr_3MgSi_2O_8$, and $Ca_3MgSi_2O_8$," *J. Electrochem. Soc.* 115(7):733–738, 1968.

Barry, "Fluorescence of $Eu^{2+}$–Activated Phases in Binary Alkaline Earth Orthosilicate Systems," *J. Electrochem. Soc.*, pp. 1181–1184, 1968.

Barry, Luminescent Properties of $Eu^{2+}$ and $Eu^{2+}$ +$Mn^{2+}$ Activated $BaMg_2Si_{Si}O_7$, *J. Electrochem. Soc.* 117(3):381–385, 19970.

Blasse et al. "Flourescence of $Eu^{2+}$–activated silicates, " *Philips Res. Rep.* 23(2):189–200, 1968 (Abstract No. 1968:472543).

Guang–Qing et al., "Photoluminescence of $Eu^{2+}$ and $Mn^{2+}$ in $Sr_3MgSi_2O_8$," *Chemical Journal Of Chinese Universities* 18(1):1–5, 1997 ( + English Summary on p. 5).

guchi et al., "Synthesis and flourescent properties of Sr2MgSi2O7:Eu, " *Okayama Rika Daigauku Kiyo*, A (1996), 32A, pp. 65–71 (Abstract No. 127:72452).

Poort et al. "Luminescence of $Eu^{2+}$ in silicate host lattices with alkaline earth ions in a row,"*J. Alloys Compd.* 241(1–2):75–81, 1996 (Abstract No. 1996:579111).

LONG AFTERGLOW SILICATE LUMINESCENT MATERIAL AND ITS MANUFACTURING METHOD

This invention relates to long afterglow luminescent material and more particularly to long afterglow silicate luminescent material and its manufacturing method.*

* This application claims priority from Chinese Application No. 97103524.5 filed Mar. 26, 1997, which application is hereby incorporated by reference in its entirety.

BACKGROUND OF THE INVENTION

Since its invention in the nineteenth century, the traditional long afterglow phosphors of ZnS series have been improved greatly, several typical products have been produced, including ZnS:Cu (which emits green light), (CaSr)S:Bi (which emits blue light) and (ZnCd)S:Cu (which emits yellowish-orange light), and they have been applied in some commercial fields, however the shortcoming of these phosphors were: poor stability, easy to decompose in air, easy to turn gray even black when irradiated under sun light, only 0.5–2 hrs short luminescent afterglow time, and luminous brightness was weak etc., all these can not satisfy the requirement for practice use. In order to improve the brightness and afterglow time, radioactive luminescent materials were made, in which some radioactive elements such as CO,Ra,$H_3$ were added, although such elements can make the phosphor continuously give out light and the phosphor has once been used in air dashboard, clock fields etc., but due to the radioactive contamination and rather expensive price, the application of the phosphor was greatly confined.

The aluminate long afterglow luminescent material was invented at the beginning of the nineties, as stated in China patent application laid open No. CN1053807A and China patent No. ZL92110744.7, its luminescent brightness, long afterglow character and stability were obviously superior to the above sulphide series products, and it has already been used in the articles for daily use, low illumination indicator board, clock, etc.

However these phosphors still have bad anti-moisture character, and they have strict restriction over the raw material's purity and form, besides, the production cost was higher, as well as single luminescent color etc., therefore it also can not satisfy the requirement of usage very well.

In 1968, T. L. Barry published the research results of luminescent spectrum and excitation spectrum of $Me_3MgSi_2O_8:Eu^{2+}$ (Me=Ca, Sr and Ba) and $Me_2SiO_4:Eu^{2+}$ (Me=Sr and Ba)(J. Electrochem. Soc. V115 No. 7, 733–738, 1968: V115 No. 11, 1181–1184, 1968); then T. L. Barry published the research result in luminescent and excitation spectrum of $BaMg_2Si_2O_7:Eu^{2+}$ (J. Electrochem. Soc. V117 No. 3, 381–385, 1970); Blasse, G etc. published fluorescence of $Eu^{2+}$ activated silicates (Philips Res. Rep. (1968), 23 (2), 189–200) in 1968. However no report on silicate phosphor which having long afterglow property has been published.

SUMMARY OF THE INVENTION

In order to solve the above problem existed in the prior art, the invention provides a kind of series silicate long afterglow luminescent material that having various luminescent colors, wide scope spectrum, better anti-moisture property and nice stability as well as the long afterglow time and high afterglow brightness.

This invention provides a new type of series long afterglow luminescent material, it is a kind of long afterglow luminescent material which use silicate as main matrix, rare earth ions and other ions as activator, and add some compounds of B or P to make the improvement of long afterglow performance, thus blue, green, yellow etc. multiple colors long afterglow luminescent characters were gained in the silicate system.

The main chemical composition of long afterglow luminescent material in this invention can be expressed by the formula:

$$aMO \cdot bM'O \cdot cSiO_2 \cdot dR:Eu_x, Ln_y \qquad (1)$$

Wherein

M represents one or more elements selected from a group consisting of Sr(strontium), Ca(calcium), Ba(barium) and Zn(zinc);

M' represents one or more elements selected from a group consisting of Mg(magnesium), Cd(cadmium), and Be(beryllium);

R represents one or two components selected from $B_2O_3$ (boric anhydride) and $P_2O_5$(di-phosphoruspentoxide);

Ln represents one or more elements selected from a group consisting of Nd(neodymiun), Dy(dysprosium), Ho(holmium), Tm(thulium), La(lanthanum), Pr(praseodymium), Tb(terbium), Ce(cerium), Mn(manganese), Bi(bismuth), Sn(tin), and Sb(antimony);

a, b, c, d, x and y are mole coefficients, wherein: $0.6 \leq a \leq 6$, $0 \leq b \leq 5$, $1 \leq c \leq 9$, $0 \leq d \leq 0.7$, $0.00001 \leq x \leq 0.2$, and $0 \leq y \leq 0.3$; these luminescent materials can give an emission spectrum between 420–650 nm when excited by the short wavelength light of 250–500 nm, its peak position is 450–580 nm, and the long afterglow luminescent colors are blue, bluish-green, green, greenish-yellow or yellow.

A preferred group of long afterglow luminescent materials according to this invention can be expressed by the main chemical composition formula (1), wherein M represents one or two elements selected from Sr and Ca; M' represents Mg; R represents one or two components selected from $B_2O_3$ and $P_2O_5$; Ln represents one or more elements selected from a group consisting of Nd, Dy, Ho, Bi and Sn, wherein $0.6 \leq a \leq 4$, $0.6 \leq b \leq 4$, $1 \leq c \leq 5$, and $0 \leq d \leq 0.4$. Preferable, the long afterglow luminescent material of this invention is characterized in that 0–40 mol % of the elements M and/or M' can be replaced by one or more elements selected from Ba, Zn, Cd and Be.

In a preferred group of long afterglow luminescent materials according to this invention, the main matrix compound of the phosphor is: $M_2MgSi_2O_7$ or $M_3MgSi_2O_7$: Eu,Ln or $M_3MgSi_2O_8$:Eu,Ln, wherein M represents $Sr_{1-z}Ca_z$, $0 \leq z \leq 1$.

In the technique of making the long afterglow luminescent material of this invention, the compounds which containing the elements in the formula (1) are used as raw material, the mole proportion of elements in the raw material used to produce the luminescent material are as follows:

M: 0.6–6 R: 0–0.7 in terms of $B_2O_3$ and $P_2O_5$

M': 0–5 Eu: 0.00001–0.2

Si: 1–9 Ln:0–0.3 wherein

M represents one or more elements selected from a group consisting of Sr, Ca, Ba and Zn,;

M' represents one or more elements selected from a group consisting of Mg, Cd and Be;

R represents one or two elements selected from B and P;

Ln represents one or more elements selected from a group consisting of Nd, Dy, Ho, Tm, La, Pr, Tb, Ce, Mn, Bi, Sn and Sb;

Wherein M, M', Ln and Eu can be incorporated in the raw materials in the form of carbonate, sulphate, nitrate, phosphate, borate, acetate, oxalate, citrate, oxide, hydroxide or halogenide or the elements or their mixture; Si can be added in the form of $SiO_2$, silicic acid, silica gel or silicate; R can be added in the form of any compounds containing B or P, with the proviso that such compounds can form $B_2O_3$ or $P_2O_5$ in the subsequent sintering procedure;

In order to produce the desired phosphor, high temperature solid-phase reaction method is used, first weighted above raw materials according to mole proportion, then ground it into fine and mixed homogeneously by using dry-mixing method, wet-mixing method in with solvents e.g. alcohol, acetone, are added and evaporated after the mixing or chemical reaction sol;-gel process method; the mixture is placed in the crucible then sintered at a temperature between 1100~1400° C. in furnace under a reducing atmosphere for about 2 to 50 hours depends on the oven's capacity and mixture's weight, for small amount mixture, it is usually fired for 2–5 hours, the reducing atmosphere is selected from $H_2(g)$, $NH_3(g)$, $N_2(g)+H_2(g)$ and carbon powder, wherein g=gas.

In order to improve the phosphor's quality, small amount (0.15 wt % based on the total weight of raw material) of additives selected from the group consisting of the compounds $NH_4Cl$, $NH_4F$, $CaF_2$, $SrF_2$, $Li_2CO_3$, $CaSO_4$, $SrSO_4$, $SrHPO_4$, and $CaHPO_4$ can be added into the raw material to participate in solid phase reaction. After sintering, the sintered mixture is milled and sifted into desired particle size phosphor.

DETAILED DESCRIPTION OF THE PREFERRED EMBODIMENTS

Figure 1:
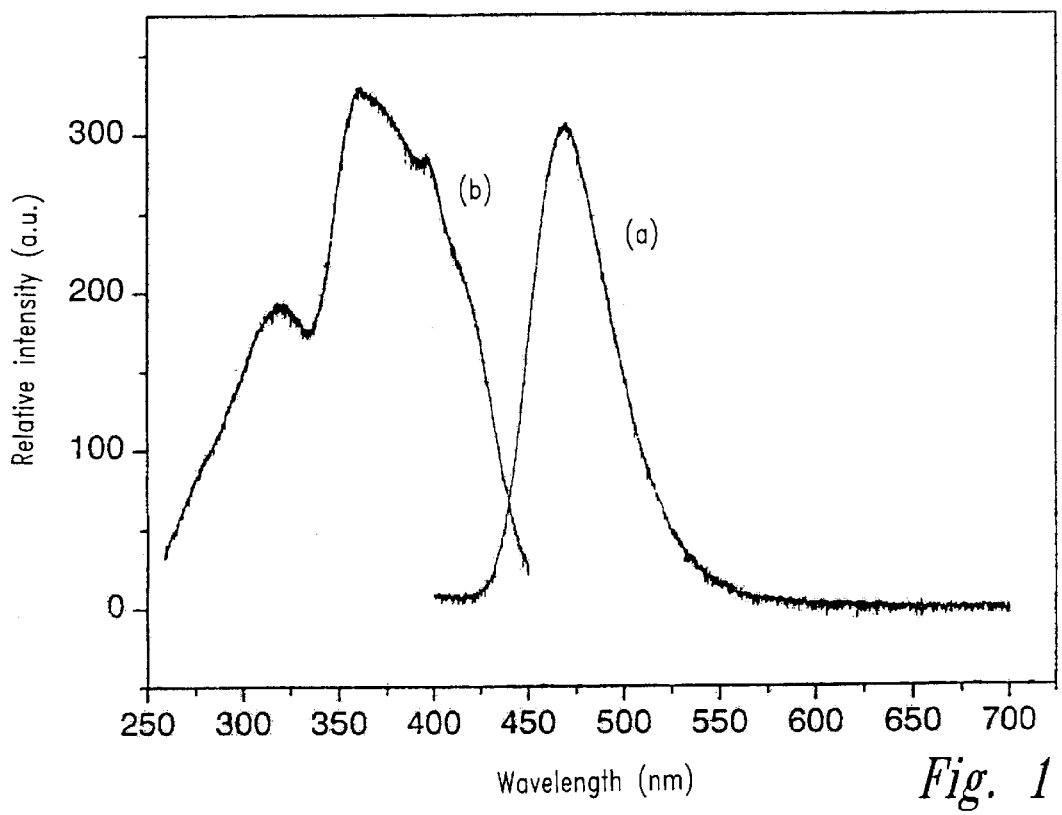
FIG. 1 represents the emission spectrum(a) and the excitation spectrum (b) of $Sr_2MgSi_2O_7$:Eu phosphor

The measurement of sample's luminescent afterglow in this invention is to put the sample in a 50 mm diameter, 5 mm deep disc, and keep it in dark room for more than 10 h, then took it out and put it under standard D65 light 10001× illuminance, after irradiated for 10 min use luminance meter measure its brightness changes with time. In the same time, excited the comparative sample under the same conditions, use comparative sample as 100 to count the sample's relative brightness value. For blue afterglow, the comparative sample is (CaSr)S:Bi; for yellow afterglow, the comparative sample is (ZnCd)S:Cu; and for green, bluish-green, greenish-yellow afterglow, the comparative sample is ZnS:Cu. Adopt x-ray diffraction method to define the phosphor's crystal structure and component, measured its x-ray diffraction value, and compared it with card value, so can define its main compound. Adopt fluorescent spectrophotometer to measure the phosphor's emission spectrum and excitation spectrum.

A lot of research work indicated that in the chemical composition formula, the different of element in M and M', results in the different colors of long afterglow, as well as the different of phosphor's main crystal structure; the change of a, b, and c value have some influences to the brightness, crystal structure and luminescent color; the different elements component in R and Ln and the change of d, x, and y coefficient value have obvious influence to the brightness, whereas have no obvious influence to the main crystal structure.

TABLE 1 shows a part of experimental results concerning the relationship between luminescent color and M, m',a,b.

TABLE 1 Experimental condition let c=2.5, d=0.1, R=$B_2O_3$, x=0.005, y=0.04, Ln=Nd, select $N_2$(90%)+$H_2$ (10%) as reducing atmosphere, synthetic temperature 1250–1320° C., sintering time 4 hrs.

TABLE 1

| | | Experiment of luminescent color | | | | | | | |
|---|---|---|---|---|---|---|---|---|---|
| Ex | Element coefficient a: | Sr | Ca | Ba | Zn | M': b: | Mg | Cd | Be | Luminescent color |
| 1 | | 3 | 0 | | | | 1 | | | blue |
| 2 | | 0 | 3 | | | | 1 | | | green |
| 3 | | 2 | 0 | | | | 1 | | | blue |
| 4 | | 0 | 2 | | | | 1 | | | yellow |
| 5 | | 0.5 | 1.5 | | | | 1 | | | greenish-yellow |
| 6 | | 1.0 | 1.0 | | | | 1 | | | green |
| 7 | | 1.5 | 0.5 | | | | 1 | | | bluish-green |
| 8 | | 1 | 0 | | | | 2 | | | blue |
| 9 | | 0 | 1 | | | | 2 | | | yellow |
| 10 | | 0.2 | 0.8 | | | | 1.9 | 0.1 | | greenish-yellow |
| 11 | | 0.5 | 0.5 | | | | 2 | | | green |
| 12 | | 0.7 | 0.3 | | | | 1.9 | | 0.1 | bluish-green |
| 13 | | 1 | 0 | | | | 3 | | | blue |

TABLE 1-continued

Experiment of luminescent color

| Ex | Element coefficient a: | M: Sr | Ca | Ba | Zn | b: | M': Mg | Cd | Be | Luminescent color |
|---|---|---|---|---|---|---|---|---|---|---|
| 14 |  | 0 | 1 |  |  |  | 3 |  |  | yellow |
| 15 |  | 0.25 | 0.75 |  |  |  | 3.0 |  |  | greenish-yellow |
| 16 |  | 0.5 | 0.5 |  |  |  | 3.0 |  |  | green |
| 17 |  | 0.75 | 0.25 |  |  |  | 3 |  |  | bluish-yellow |
| 18 |  | 1 | 1.8 |  | 0.2 |  | 1 |  |  | greenish-yellow |
| 19 |  | 1.4 | 1.4 |  | 0.2 |  | 1 |  |  | green |
| 20 |  | 2.0 | 1 |  |  |  | 1 |  |  | bluish-green |
| 21 |  | 1.4 | 0.35 |  |  |  | 1.25 |  |  | bluish-green |
| 22 |  | 1.2 | 0.3 |  |  |  | 1.5 |  |  | bluish-green |
| 23 |  | 1.0 | 0.25 |  |  |  | 1.75 |  |  | bluish-green |
| 24 |  | 0.875 | 0.875 |  |  |  | 1.25 |  |  | green |
| 25 |  | 0.75 | 0.75 |  |  |  | 1.5 |  |  | green |
| 26 |  | 0.625 | 0.625 |  |  |  | 1.75 |  |  | green |
| 27 |  | 0.525 | 1.225 |  |  |  | 1.25 |  |  | greenish-yellow |
| 28 |  | 0.45 | 1.05 |  |  |  | 1.5 |  |  | greenish-yellow |
| 29 |  | 0.375 | 0.875 |  |  |  | 1.75 |  |  | greenish-yellow |
| 30 |  | 0.363 | 1.487 |  |  |  | 1.25 |  |  | light yellow |
| 31 |  | 0.225 | 1.275 |  |  |  | 1.5 |  |  | light yellow |
| 32 |  | 0.187 | 1.063 |  |  |  | 1.75 |  |  | light yellow |

Figure 14:
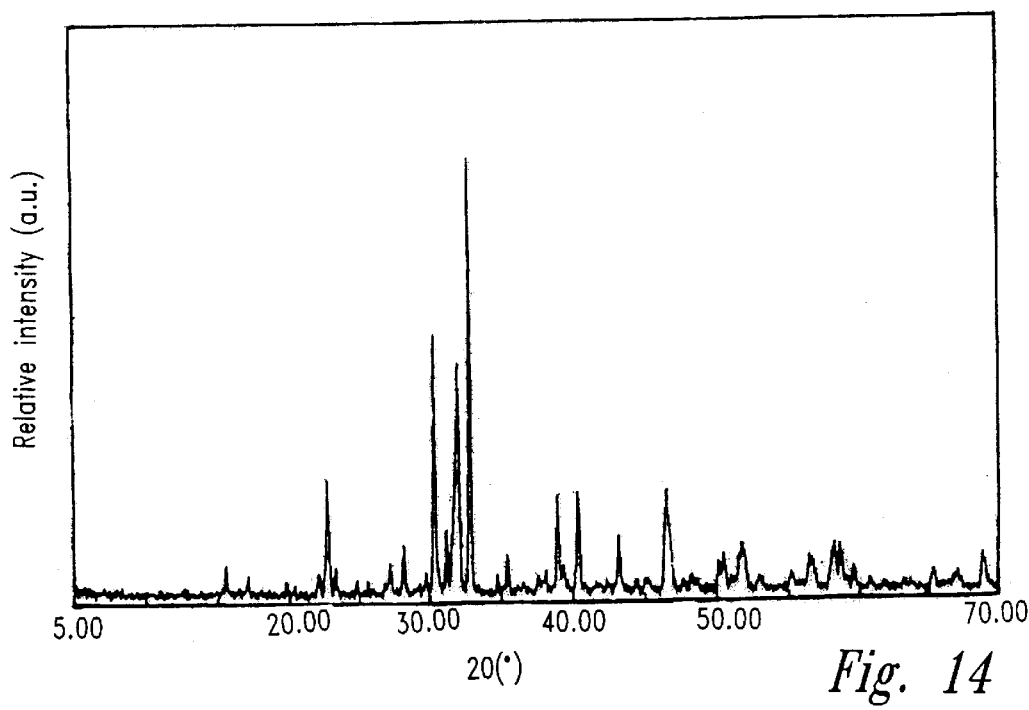
FIG. 14 represents the x-ray diffraction pattern of $Sr_3MgSi_2O_7$:Eu,Dy phosphor

When M represents Sr or represents Sr,Ca,Ba and Zn, wherein Sr is the main element, Ca, Ba, and Zn are secondary elements, M' represents Mg or represents Mg,Cd and Be, wherein Mg is the main element, Cd and Be are secondary elements, the synthetic phosphor can presents blue—bluish-green afterglow luminescence after irradiated by short wavelength light of 250–450 nm. Experiments indicate that the different value of a, b and c has certain influence to the phosphor's luminescent brightness and structure, when $0.6 \leq a \leq 4$, $0.6 \leq b \leq 4$ and $1 \leq c \leq 5$, the phosphor presents brighter blue—bluish-green luminescent color, when $1.5 \leq a \leq 2$, $0.6 \leq b \leq 2$, and $1.5 \leq c \leq 2.5$, according to the x-ray diffraction pattern, the main matrix compound of the phosphor is defined as $Sr_2MgSi_2O_7$ as well as its crystal structure, see FIG. 2; when exceed the above coefficient scope, there may appear $Sr_2MgSi_2O_7$ compound, but the more other compounds exist too; when $2.7 \leq a \leq 3.3$, $0.8 \leq b \leq 1.2$ and $1.7 \leq c \leq 2.3$, the phosphor's main compound is $Sr_3MgSi_2O_8$, see FIG. 14.

Figure 16:
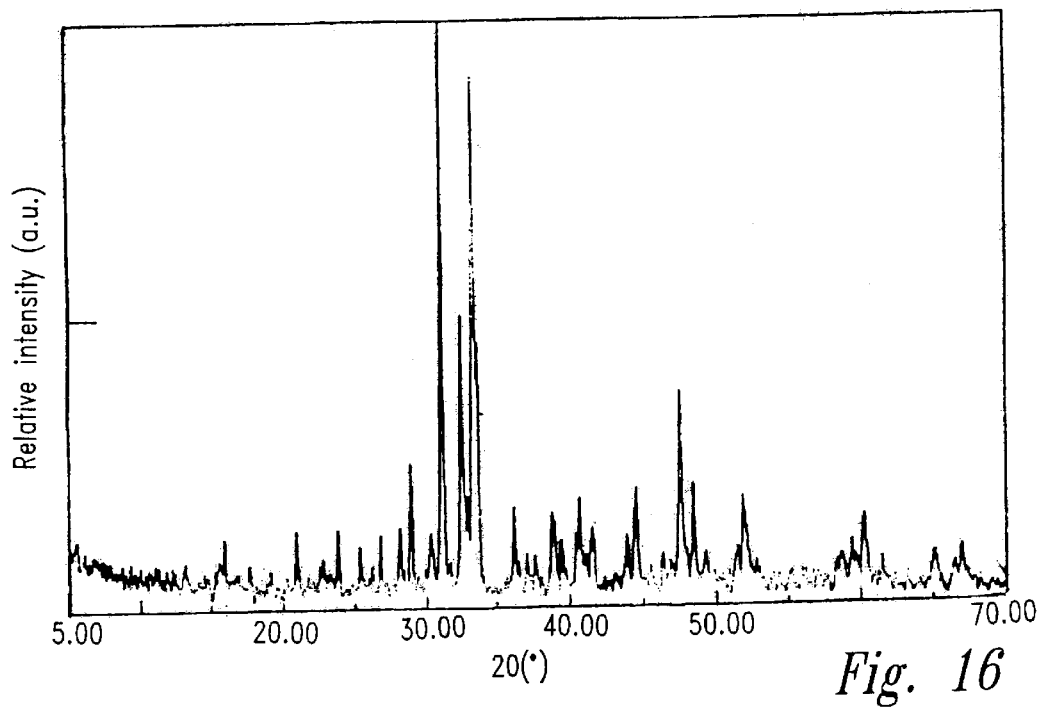
FIG. 16 represents the x-ray diffraction pattern of $Ca_3MgSi_2O_8$:Eu,Dy phosphor

When M represents Ca or represents Ca,Sr,Ba and Zn, wherein Ca is the main element, Sr, ba and Zn are secondary elements, M' represents Mg or represents Mg,Cd and Be, wherein Mg is the main element, Cd and Be are secondary elements, the synthetic phosphor can presents green-yellow afterglow luminescent color after irradiated by the short wavelength light of 250–500 nm. The same experiment indicates that the different value of a, b and c has certain influence to the phosphor's luminescent brightness and structure, when $0.6 \leq a \leq 4$, $0.6 \leq b \leq 4$, $1 \leq c \leq 5$, the phosphor presents brighter green-yellow luminescence, when $1.5 \leq a \leq 2.4$, $0.6 \leq b \leq 2$, and $1.5 \leq c \leq 2.5$, according to the x-ray diffraction pattern, the main matrix compound of the phosphor is defined as $Ca_2MgSi_2O_7$ as well as its crystal structure, see FIG. 6; when exceed the above coefficient scope, there may appear $Ca_2MgSi_2O_7$ compound, but the other compounds are more than the former; when $2.7 \leq a \leq 3.3$, $0.8 \leq b \leq 1.2$, and $1.7 \leq c \leq 2.3$, the phosphor's main matrix compound is $Ca_2MgSi_2O_8$, see FIG. 16.

When M represents Sr and/or Ca, for easy to show, adopt formula $Sr_{1-z}Ca_z$, wherein $0 \leq z \leq 1$, or represent $Sr_{1-z}Ca_z$, Ba and Zn, wherein $Sr_{1-z}Ca_z$ are the main element, Ba and Zn are secondary elements, M' represents Mg or represents Mg, Cd and Be, wherein Mg is the main element, Cd and Be are secondary elements, with the change of z value, the synthetic phosphor presents blue—bluish-green—greenish-yellow—yellow the afterglow luminescence: when z=0, color is blue; z=1, it's green-yellow; 0<z<0.5, mainly is bluish-green—green color; 0.5<z<1, mainly is green-greenish-yellow color; z=0.5 or near it is green. Just the same, the different values of a, b and c have certain influence to the phosphor's luminescent brightness and structure, when $0.6 \leq a \leq 4$, $0.6 \leq b \leq 4$ and $1 \leq c \leq 5$, the phosphor presents bluish-green, green and greenish-yellow afterglow luminescent color, when $1.5 \leq a \leq 2.4$ $0.6 \leq c \leq 2$ and $1.5 \leq c \leq 2.5$, analyze its diffraction pattern it is similar to that of $Sr_2MgSi_2O_7$ and $Ca_2MgSi_2O_7$, considering with the element's match, the phosphor's main matrix compound can be deduced as $(Sr_{1-z}Ca_z)_2MgSi_2O_7$, see FIG. 9; when the above coefficients scope are exceeded, the compound of $(Sr_{1-z}Ca_z)_2MgSi_2O_7$ can be appeared, but there are more other components.

Refer to the luminescent material's formula in Luminescence, when the crystal structure of phosphor have not yet been defined, it can be expressed by the main component of the phosphor, that is expressed by chemical composition formula; when the main compound and the crystal structure of the phosphor is defined, it should be expressed by chemical formula in this invention.

According to the compound and crystal structure of the above phosphor in this invention, the main chemical formula of this phosphor is: $M_2MgSi_2O_7$:Eu, Ln or $M_3MgSi_2O_8$:Eu Ln, wherein M presents $Sr_{1-z}Ca_z 0 \leq z \leq 1$.

When M represents Ba, $4 \leq a \leq 6$, b=0 and $6 \leq c \leq 9$, the phosphor presents light green afterglow, according to x-ray diffraction pattern its main compound is defined as $Ba_5Si_8O_{21}$, so the main chemical formula of this phosphor is $Ba_5Si_8O_{21}$:Eu,Ln.

When M represents Zn, $1 \leq a \leq 3$, b=0 and $0.7 \leq c \leq 1.5$, the phosphor presents light green afterglow, according to x-ray diffraction pattern its main compound is defined as $Zn_2SiO_4$, so the main chemical formula of this phosphor is $Zn_2SiO_4$:Eu,Ln.

When M represents $Sr_{1-z}Ca_z 0 \leq z \leq 1$, M' represents Mg, where 0–40% mol M and/or M' can be replaced by one or more elements selected from a group consisting of Ba, Zn Cd and Be, the phosphor has long afterglow property, especially when 5–20% mol M and/or M' replaced by one or two of Ba and Cd, the phosphor have good luminescent performance.

In chemical composition formula, without R and/or Ln element (that is when d and/or y is zero), the synthetic phosphor can also give out afterglow. If R and/or Ln exist in the phosphor, its luminescent afterglow intensity has been strengthened obviously, certainly the mole coefficient d and y may affect the afterglow luminescent intensity, adding different elements of Ln causes different luminescent intensity, two or more elements' adding will be even better than that of single element in luminescent effect.

When y=0, the phosphor's chemical composition formula is $aMO \cdot bM'O \cdot cSiO_2 \cdot dR:Eu_x$, Eu is the activator, its emission spectrum is characterized by $Eu^{2+}$, that means Eu is the main activator, the afterglow luminescent intensity changes with x value, the suitable scope of x is: $0.00001 \leq x \leq 0.2$.

When y>0, Ln exists in the phosphor, the experiment indicate that when one or more elements of Nd, Dy, Ho, Tm, La, Pr, Tb, Ce, Mn, Bi, Sn and Sb are doped, it will have certain enhance in phosphor's luminescent intensity, especially obvious effect can be seen in Nd,Dy,Ho,Bi and Sn, experiment indicate that when $0>y \leq 0.3$, it has obvious enhancement function to the phosphor, whose afterglow luminescent intensity are much higher and the decay time are much longer than that of without Ln, see experiment in TABLE 2–10, according to the Luminescence theory, it can act as co-activator function.

When d=0, the phosphor's chemical composition formula is $aMO \cdot bM'O \cdot cSiO_2 \cdot dR:Eu_x,Ln_y$, this phosphor presents certain long afterglow effect the afterglow luminescent intensity changes with x and y value.

When d>0, the adding of R component can obviously improve the phosphor's long afterglow luminescent intensity compared with that of d=0, the R component of the phosphor can be the compounds of B or p, i.e. $B_2O_3$, $H_3BO_3$, $P_2O_5$, $H_3PO_4$, $(NH_4)_2HPO_4$, $NH_4H_2PO_4$ etc., adding of these components can improve the phosphor's long afterglow luminescent intensity, reduce the phosphor's synthetic temperature, improve the phosphor's synthetic quality, and loosened the powder of synthetic phosphor, increase the produce rate.

The influence of R component to the phosphor's luminescent property, see TABLE 2.

TABLE 2 Select bluish-green phosphor in this experiment, let $M=Sr_{0.75} Ca_{0.25}$, $M'=Mg$, $R=B_2O_3$ and/or $P_2O_5$, Ln=Dy, a=1.5, b=1.5, c=2.5, x=0.01, y=0.08, $NH_3(g)$ as reducing atmosphere, and synthetic temperature at 1280° C.

TABLE 2

The R and Ln component function experiment

| | | Relative afterglow intensity | |
|---|---|---|---|
| Ex | Chemical composition formula | 10° | 60° |
| 1 | $1.5(Sr_{0.75}Ca_{0.25})O \cdot 1.5MgO \cdot 2.5SiO_2:Eu_{0.01}$ | 40.1 | 102 |
| 2 | $1.5(Sr_{0.75}Ca_{0.25})O \cdot 1.5MgO \cdot 2.5SiO_2:0.1B_2O_3:Eu_{0.01}$ | 114 | 176 |
| 3 | $1.5(Sr_{0.75}Ca_{0.25})O \cdot 1.5MgO \cdot 2.5SiO_2:0.5P_2O_5:Eu_{0.01}$ | 94.6 | 137 |
| 4 | $1.5(Sr_{0.75}Ca_{0.25})O \cdot 1.5MgO \cdot 2.5SiO_2:0.1B_2O_3 \cdot 0.05P_2O_5:Eu_{0.01}$ | 121 | 182 |
| 5 | $1.5(Sr_{0.75}Ca_{0.25})O \cdot 1.5MgO \cdot 2.5SiO_2:Eu_{0.01}Dy_{0.08}$ | 772 | 1540 |
| 6 | $1.5(Sr_{0.75}Ca_{0.25})O \cdot 1.5MgO \cdot 2.5SiO_2:0.1B_2O_3:Eu_{0.03}Dy_{0.08}$ | 2541 | 4808 |
| 7 | $1.5(Sr_{0.75}Ca_{0.25})O \cdot 1.5MgO \cdot 2.5SiO_2:0.05P_2O_5:Eu_{0.03}Dy_{0.08}$ | 1724 | 3946 |
| 8 | $1.5(Sr_{0.75}Ca_{0.25})O \cdot 1.5MgO \cdot 2.5SiO_2:0.1B_2O_3 \cdot 0.05P_2O_5:Eu_{0.01}Dy_{0.08}$ | 2638 | 4972 |

The influence of R's amount to the phosphor's luminescent property, show in TABLE 3. TABLE 3 select blue and green phosphor, in experiment 1-8, let M=Sr, M'=Mg, a=2, b=1, c=2, $R=B_2O_3$, x=0.004.

Experiment 9-14 is green phosphor, wherein $M=Sr_{0.5}Ca_{0.5}$, M'=Mg, a=2, b=1, c=2.3, $R=P_2O_5$, Ln=Dy, x=0.004, y=0.01.

TABLE 3

The effect of R component experiment:

| | | R (raw | | Relative afterglow intensity | | synthesizing temperature |
|---|---|---|---|---|---|---|
| Ex. | Chemical composition formula | material) | d | 10' | 60' | (C.°) |
| 1 | $2SrO \cdot MgO \cdot 2SiO_2:Eu_{0.004}$ | 0 | 0 | 37.4 | 100 | 1350 |
| 2 | $2SrO \cdot MgO \cdot 2SiO_2 \cdot 0.01B_2O_3:Eu_{0.004}$ | $2H_3BO_3$ | 0.01 | 78.7 | 115.4 | 1340 |
| 3 | $2SrO \cdot MgO \cdot 2SiO_2 \cdot 0.05B_2O_3:Eu_{0.004}$ | $2H_3BO_3$ | 0.05 | 134.8 | 169.2 | 1330 |
| 4 | $2SrO \cdot MgO \cdot 2SiO_2 \cdot 0.1B_2O_3:Eu_{0.004}$ | $2H_3BO_3$ | 0.1 | 132.4 | 158.5 | 1320 |
| 5 | $2SrO \cdot MgO \cdot 2SiO_2 \cdot 0.2B_2O_3:Eu_{0.004}$ | $2H_3BO_3$ | 0.2 | 109.2 | 127 | 1310 |
| 6 | $2SrO \cdot MgO \cdot 2SiO_2 \cdot 0.3B_2O_3:Eu_{0.004}$ | $2H_3BO_3$ | 0.3 | 94.5 | 102 | 1280 |
| 7 | $2SrO \cdot MgO \cdot 2SiO_2 \cdot 0.5B_2O_3:Eu_{0.004}$ | $2H_3BO_3$ | 0.5 | 73.4 | 96.4 | 1230 |
| 8 | $2SrO \cdot MgO \cdot 2SiO_2 \cdot 0.7B_2O_3:Eu_{0.004}$ | $2H_3BO_3$ | 0.7 | 42.1 | 74.2 | 1150 |
| 9 | $2(Sr_{0.3}Ca_{0.3})O \cdot MgO \cdot 2.3SiO_2:Eu_{0.004}Dy_{0.01}$ | 0 | 0 | 482.4 | 1263.2 | 1350 |

TABLE 3-continued

The effect of R component experiment:

| Ex. | Chemical composition formula | R (raw material) | d | Relative afterglow intensity 10' | 60' | synthesizing temperature (C.°) |
|---|---|---|---|---|---|---|
| 10 | $2(Sr_{0.5}Ca_{0.5})O.MgO.2.3SiO_2.0.05P_2O_5:Eu_{0.004}Dy_{0.01}$ | $2NH_4H_2PO_4$ | 0.05 | 613 | 1804 | 1340 |
| 11 | $2(Sr_{0.3}Ca_{0.5})O.MgO.2.3SiO_2.0.1P_2O_5:Eu_{0.004}Dy_{0.01}$ | $2NH_4H_2PO_4$ | 0.1 | 1034 | 2542 | 1320 |
| 12 | $2(Sr_{0.5}Ca_{0.5})O.MgO.2.3SiO_2.0.2P_2O_5:Eu_{0.004}Dy_{0.01}$ | $2NH_4H_2PO_4$ | 0.2 | 807 | 2326 | 1310 |
| 13 | $2(Sr_{0.3}Ca_{0.5})O.MgO.2.3SiO_2.0.3P_2O_5:Eu_{0.004}Dy_{0.01}$ | $2NH_4H_2PO_4$ | 0.3 | 721 | 1702 | 1250 |
| 14 | $2(Sr_{0.3}Ca_{0.5})O.MgO.2.3SiO_2.0.5P_2O_5:Eu_{0.004}Dy_{0.01}$ | $2NH_4H_2PO_4$ | 0.5 | 501 | 1271 | 1200 |

Experiment indicates when $0 \leq d \leq 0.7$, the phosphor's luminescent intensity can be influenced, the amount of R(d) at $0 < d \leq 0.4$ is better. The exist of R component, analyzed from phosphor's x-ray diffraction pattern, have no obvious influence on the above phosphor's crystal structure and compound, its main compound is silicate component, however, B and P elements existed in phosphor are defined by spectrometric analysis, that means the phosphor contains B and P components, according tis chemical composition, marked as $B_2O_3$ and $P_2O_5$.

A part of the long afterglow luminescent materials in this invention is described as follows:

(1) Blue long afterglow luminescent material

When M=Sr, M'=Mg, R=$B_2O_3$, a=2, b=1, c=2, D=0.1, the phosphor's chemical composition formula is: $2SrO—MgO—2SiO_{2-0.1}B_2O_3:Eu_xLn_y$, change the value of x, the elements of Ln and the value of y, the experiment results shown in TABLE 4.

TABLE 4

| Experiment | Chemical composition formula | Relative afterglow intensity 10' | 60' |
|---|---|---|---|
| 1-1 | $2SrO.MgO.2SiO_2.0.1B_2O_3.Eu_{0.0001}$ | 67 | 114 |
| 1-2 | $2SrO.MgO.2SiO_2.0.1B_2O_3.Eu_{0.0004}$ | 81 | 122 |
| 1-3 | $2SrO.MgO.2SiO_2.0.1B_2O_3.Eu_{0.001}$ | 124 | 143 |
| 1-4 | $2SrO.MgO.2SiO_2.0.1B_2O_3.Eu_{0.004}$ | 136 | 178 |
| 1-5 | $2SrO.MgO.2SiO_2 -0.1B_2O_3.Eu_{0.001}$ | 130 | 167 |
| 1-6 | $2SrO.MgO.2SiO_2 -0.1B_2O_3.Eu_{0.01}$ | 91 | 121 |
| 1-7 | $2SrO.MgO.2SiO_2 -0.1B_2O_3.Eu_{0.2}$ | 80 | 102 |
| 2-1 | $2SrO.MgO.2SiO_2.0.1B_2O_3.Eu_{0.004}Nd_{0.001}$ | 621 | 734 |
| 2-2 | $2SrO.MgO.2SiO_2.0.1B_2O_3.Eu_{0.004}Nd_{0.003}$ | 884 | 896 |
| 2-3 | $2SrO.MgO.2SiO_2.0.1B_2O_3.Eu_{0.004}Nd_{0.01}$ | 1130 | 1175 |
| 2-4 | $2SrO.MgO.2SiO_2.0.1B_2O_3.Eu_{0.004}Nd_{0.04}$ | 1527 | 1847 |
| 2-5 | $2SrO.MgO.2SiO_2.0.1B_2O_3.Eu_{0.004}Nd_{0.1}$ | 862 | 859 |
| 2-6 | $2SrO.MgO.2SiO_2.0.1B_2O_3.Eu_{0.004}Nd_{0.5}$ | 645 | 692 |
| 3-1 | $2SrO.MgO.2SiO_2.0.1B_2O_3.Eu_{0.004}Dy_{0.0005}$ | 592 | 913 |
| 3-2 | $2SrO.MgO.2SiO_2.0.1B_2O_3.Eu_{0.004}Dy_{0.004}$ | 927 | 1754 |
| 3-3 | $2SrO.MgO.2SiO_2.0.1B_2O_3.Eu_{0.004}Dy_{0.01}$ | 1108 | 2100 |
| 3-4 | $2SrO.MgO.2SiO_2.0.1B_2O_3.Eu_{0.004}Dy_{0.04}$ | 1658 | 3947 |
| 3-5 | $2SrO.MgO.2SiO_2.0.1B_2O_3.Eu_{0.004}Dy_{0.08}$ | 1421 | 3136 |
| 3-6 | $2SrO.MgO.2SiO_2.0.1B_2O_3.Eu_{0.004}Dy_{0.15}$ | 1215 | 2306 |
| 3-7 | $2SrO.MgO.2SiO_2.0.1B_2O_3.Eu_{0.004}Dy_{0.3}$ | 823 | 1214 |
| 4-1 | $2SrO.MgO.2SiO_2.0.1B_2O_3.Eu_{0.004}Ho_{0.0004}$ | 827 | 1512 |
| 4-2 | $2SrO.MgO.2SiO_2.0.1B_2O_3.Eu_{0.004}Ho_{0.001}$ | 1014 | 1894 |
| 4-3 | $2SrO.MgO.2SiO_2.0.1B_2O_3.Eu_{0.004}Ho_{0.05}$ | 1472 | 2246 |
| 4-4 | $2SrO.MgO.2SiO_2.0.1B_2O_3.Eu_{0.004}Ho_{0.1}$ | 1034 | 1675 |
| 5-1 | $2SrO.MgO.2SiO_2.0.1B_2O_3.Eu_{0.004}Tm_{0.001}$ | 289 | 310 |
| 5-2 | $2SrO.MgO.2SiO_2.0.1B_2O_3.Eu_{0.004}Tm_{0.05}$ | 378 | 420 |
| 5-3 | $2SrO.MgO.2SiO_2.0.1B_2O_3.Eu_{0.004}Tm_{0.1}$ | 384 | 456 |
| 6-1 | $2SrO.MgO.2SiO_2.0.1B_2O_3.Eu_{0.004}La_{0.001}$ | 204 | 189 |
| 6-2 | $2SrO.MgO.2SiO_2.0.1B_2O_3.Eu_{0.004}La_{0.005}$ | 235 | 267 |
| 6-3 | $2SrO.MgO.2SiO_2.0.1B_2O_3.Eu_{0.004}La_{0.02}$ | 269 | 317 |
| 7-1 | $2SrO.MgO.2SiO_2.0.1B_2O_3.Eu_{0.004}Pr_{0.001}$ | 275 | 292 |
| 7-2 | $2SrO.MgO.2SiO_2.0.1B_2O_3.Eu_{0.004}Pr_{0.004}$ | 254 | 264 |
| 7-3 | $2SrO.MgO.2SiO_2.0.1B_2O_3.Eu_{0.004}Pr_{0.02}$ | 250 | 253 |
| 8-1 | $2SrO.MgO.2SiO_2.0.1B_2O_3.Eu_{0.004}Tb_{0.001}$ | 224 | 267 |
| 8-2 | $2SrO.MgO.2SiO_2.0.1B_2O_3.Eu_{0.004}Tb_{0.004}$ | 284 | 368 |
| 8-3 | $2SrO.MgO.2SiO_2.0.1B_2O_3.Eu_{0.004}Tb_{0.02}$ | 230 | 276 |
| 9-1 | $2SrO.MgO.2SiO_2.0.1B_2O_3.Eu_{0.004}Ca_{0.0017}$ | 278 | 367 |
| 9-2 | $2SrO.MgO.2SiO_2.0.1B_2O_3.Eu_{0.004}Ca_{0.007}$ | 238 | 262 |
| 9-3 | $2SrO.MgO.2SiO_2.0.1B_2O_3.Eu_{0.004}Ca_{0.0027}$ | 224 | 237 |
| 10-1 | $2SrO.MgO.2SiO_2.0.1B_2O_3.Eu_{0.004}Mn_{0.001}$ | 264 | 290 |
| 10-2 | $2SrO.MgO.2SiO_2.0.1B_2O_3.Eu_{0.004}Mn_{0.005}$ | 273 | 287 |
| 10-3 | $2SrO.MgO.2SiO_2.0.1B_2O_3.Eu_{0.004}Mn_{0.02}$ | 232 | 264 |
| 11-1 | $2SrO.MgO.2SiO_2.0.1B_2O_3.Eu_{0.004}Bi_{0.001}$ | 254 | 347 |
| 11-2 | $2SrO.MgO.2SiO_2.0.1B_2O_3.Eu_{0.004}Bi_{0.005}$ | 314 | 472 |
| 11-3 | $2SrO.MgO.2SiO_2.0.1B_2O_3.Eu_{0.004}Bi_{0.02}$ | 421 | 564 |
| 12-1 | $2SrO.MgO.2SiO_2.0.1B_2O_3.Eu_{0.004}Sb_{0.0016}$ | 195 | 227 |
| 12-2 | $2SrO.MgO.2SiO_2.0.1B_2O_3.Eu_{0.004}Sb_{0.006}$ | 184 | 215 |
| 12-3 | $2SrO.MgO.2SiO_2.0.1B_2O_3.Eu_{0.004}Mn_{0.025}$ | 147 | 169 |
| 13-1 | $2SrO.MgO.2SiO_2.0.1B_2O_3.Eu_{0.004}Sn_{0.001}$ | 124 | 138 |
| 13-2 | $2SrO.MgO.2SiO_2.0.1B_2O_3.Eu_{0.004}Sn_{0.005}$ | 278 | 367 |
| 13-3 | $2SrO.MgO.2SiO_2.0.1B_2O_3.Eu_{0.004}Sn_{0.02}$ | 167 | 236 |
| 14-1 | $2SrO.MgO.2SiO_2.0.1B_2O_3.Eu_{0.004}Nd_{0.02}Dy_{0.01}$ | 1831 | 3150 |
| 15-1 | $2SrO.MgO.2SiO_2.0.1B_2O_3.Eu_{0.004}Nd_{0.02}Sn_{0.01}$ | 1672 | 2804 |
| 16-1 | $2SrO.MgO.2SiO_2.0.1B_2O_3.Eu_{0.004}Dy_{0.02}Bi_{0.01}$ | 1837 | 4356 |
| Comparative sample | Zn:S:Cu | 100 | 100 |

Figure 2:
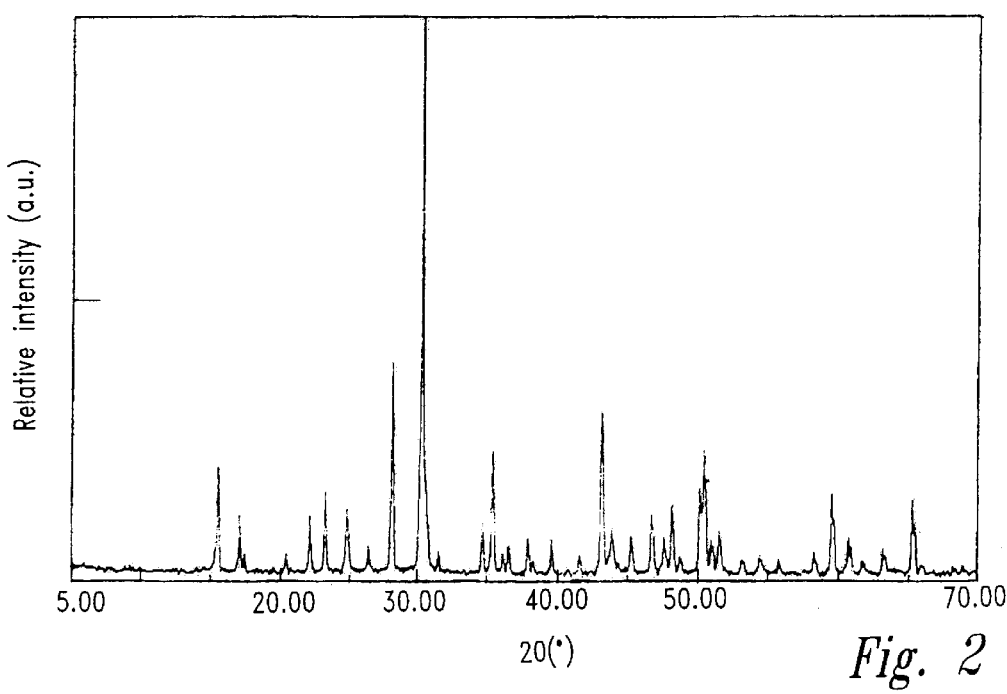
FIG. 2 represents the x-ray diffraction pattern of $Sr_2MgSi_2O_7$:Eu phosphor
Figure 3:
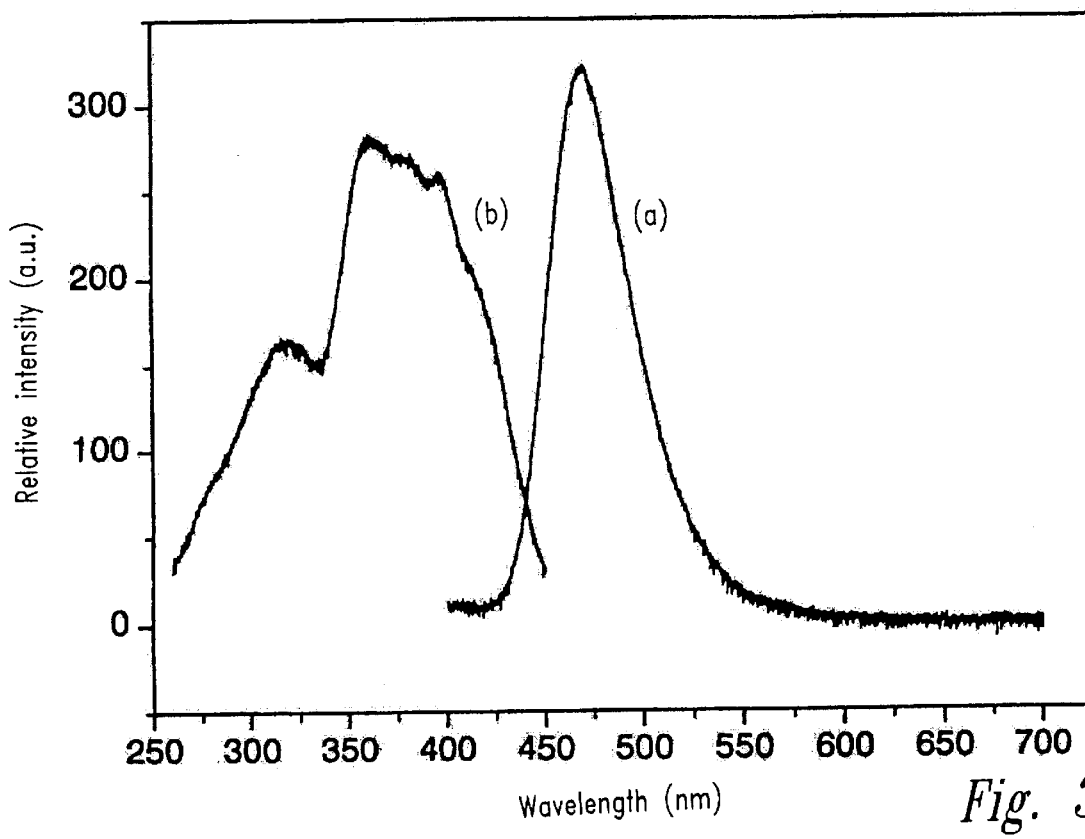
FIG. 3 represents the emission spectrum(a) and the excitation spectrum (b) of $Sr_2MgSi_2O_7$:Eu,Dy phosphor

The experimental phosphor shown in TABLE 4 can display blue afterglow luminescence after irradiated under sun light, fluorescent lamp or ultraviolet lamp, when excited under 365 nm ultraviolet light, it can give 420–550 nm broad band emission spectrum, with peak position near 469 nm; its excitation spectrum is 250–450 nm broad band spectrum, when monitoring at 469 nm, indicate this phosphor has strong absorbing ability to short wavelength light, its main matrix compound is defined as $Sr_2MgSi_2O_7$ through x-ray diffraction pattern, the peak position of spectrum can exert certain shift for the different adding component. FIG. 1 (a), (b) and FIG. 2 are emission spectrum, excitation spectrum and x-ray diffraction pattern of the experimental phosphor 1-4 respectively, whose emission spectrum peak position is 469 nm; FIG. 3(a), (b) are emission spectrum and excitation spectrum of the experimental phosphor 3-4, its emission spectrum peak position is 470 nm.

1. If y=0 in the chemical composition formula, that means no Ln ion exist, the amount of Eu(x) added may have certain influence to afterglow intensity, shown as experiment 1-1~7 in TABLE 4. Compared with comparative sample (CaSr)S:Bi, this phosphor presents certain long afterglow luminescent effect. Further experiment indicates that when the Eu's amount x is less than 0.00001 mol or more than 0.2 mol. its luminescent intensity is weak, so $0.00001 \leq x \leq 0.2$ is defined.

2. If x=0.004, Ln=Nd, the afterglow intensity corresponding to the changes of the amount of Nd(y) added, see experiment 2-1~6 in TABLE 4, $0.00001 \leq y \leq 0.3$ are suitable for the amount of Nd(y) added, it can be seen that afterglow intensity is obviously stronger than that of experiment 1-1~7, this indicate that the adding of Nd can strengthen the phosphor's luminescent performance. Draw a log—log afterglow afterglow characteristic curve concerning the phosphor's luminescent afterglow varies with the decay time, this curve is almost a straight line, its decay time can prolong to more than 20 hrs when afterglow brightness reach the eye's lowest visual luminosity 0.32 mcd/m$^2$.

Figure 4:
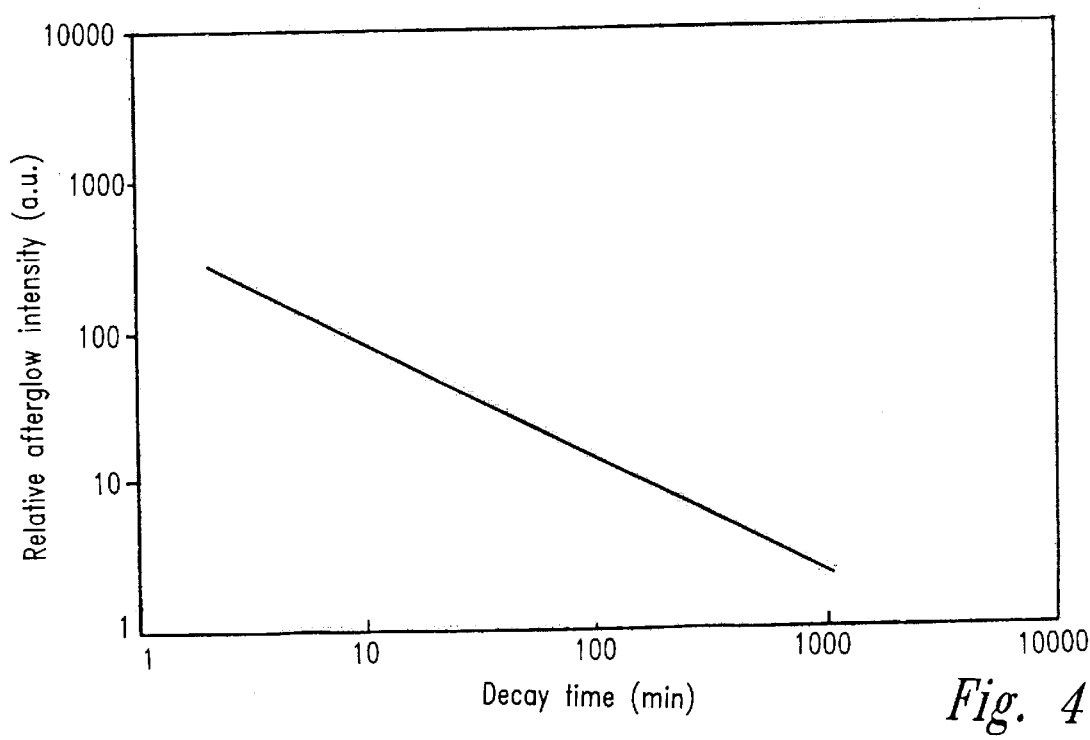
FIG. 4 represents the afterglow characteristic curve of $Sr_2MgSi_2O_7$:Eu,Dy phosphor

3. If x=0.004, Ln=Nd, the afterglow intensity corresponding to the changes of the amount of Dy(y) added, see experiment 3-1~7 in TABLE 1, $0.00001 \leq y \leq 0.3$ are suitable for the amount of Dy(y) added, it can be seen that afterglow intensity is obviously stronger than that of experiment 1-1~7, this indicates that the adding of Dy strengthened the phosphor's luminescent performance. Draw a log—log afterglow afterglow characteristic curve concerning the phosphor's luminescent afterglow varies with the decay time, this curve was almost a straight line, see FIG. 4, its decay time can prolong for more than 35 hrs by eye's lowest visual luminosity.

4. If x=0.004, Ln is Ho, Tm, La, Pr, Tb, Ce, Mn, Bi, Sb, Sn and double elements Nd, Dy; Nd, Sn; and Dy, Bi respectively, its afterglow effect that corresponding the amount of Ly(y) added, see experiment 4~16 in TABLE 4.

From the above results, it can be seen that these phosphor's luminescent afterglow effect are obviously superior to that of the comparative phosphor. Especially the adding of Nd, Dy, Ho, Bi, Sn makes the effect even better. According to the crystal structure and main compound of the above phosphor, the blue series phosphor's chemical formula is $Sr_2MgSi_2O_7$:Eu,Ln.

(2) Yellow long afterglow luminescent material

When M=Ca, M'=Mg, R=$B_2O_3$, a=2, b=1, c=2, d=0.15, the phosphor's chemical composition formula is: $2CaO \cdot MgO \cdot 2SiO_2 \cdot 0.15B_2O_3$:$Eu_x \cdot Ln_y$, change the value of x, the elements of Ln, and the value of y, its experimental results shown in TABLE 5.

TABLE 5

| Experiment | Chemical composition formula | Relative afterglow intensity | |
|---|---|---|---|
| | | 10' | 60' |
| 1-1 | $2CaO.MgO.2SiO_2.0.1B_2O_3.Eu_{0.0001}$ | 127 | 217 |
| 1-2 | $2CaO.MgO.2SiO_2.0.1B_2O_3.Eu_{0.004}$ | 201 | 404 |
| 1-3 | $2CaO.MgO.2SiO_2.0.1B_2O_3.Eu_{0.001}$ | 238 | 417 |
| 1-4 | $2CaO.MgO.2SiO_2.0.1B_2O_3.Eu_{0.004}$ | 223 | 389 |
| 1-5 | $2CaO.MgO.2SiO_2 -0.1B_2O_3.Eu_{0.001}$ | 152 | 345 |
| 1-6 | $2CaO.MgO.2SiO_2 -0.1B_2O_3.Eu_{0.01}$ | 56 | 127 |
| 1-7 | $2CaO.MgO.2SiO_2 -0.1B_2O_3.Eu_{0.2}$ | 45 | 87 |
| 2-1 | $2CaO.MgO.2SiO_2.0.1B_2O_3Eu_{0.004}Dy_{0.0005}$ | 387 | 1071 |
| 2-2 | $2CaO.MgO.2SiO_2.0.1B_2O_3.Eu_{0.004}Dy_{0.01}$ | 832 | 1324 |
| 2-3 | $2CaO.MgO.2SiO_2.0.1B_2O_3.Eu_{0.004}Dy_{0.05}$ | 914 | 1451 |
| 2-4 | $2CaO.MgO.2SiO_2.0.1B_2O_3.Eu_{0.004}Dy_{0.15}$ | 597 | 921 |
| 3-1 | $2CaO.MgO.2SiO_2.0.1B_2O_3.Eu_{0.004}Nd_{0.0002}$ | 512 | 714 |
| 3-2 | $2CaO.MgO.2SiO_2.0.1B_2O_3.Eu_{0.004}Nd_{0.01}$ | 490 | 837 |
| 4-1 | $2CaO.MgO.2SiO_2.0.1B_2O_3.Eu_{0.004}Ho_{0.01}$ | 482 | 694 |
| 4-2 | $2CaO.MgO.2SiO_2.0.1B_2O_3.Eu_{0.004}Ho_{0.05}$ | 531 | 728 |
| 5-1 | $2CaO.MgO.2SiO_2.0.1B_2O_3.Eu_{0.004}Tm_{0.01}$ | 417 | 623 |
| 5-2 | $2CaO.MgO.2SiO_2.0.1B_2O_3.Eu_{0.004}Tm_{0.05}$ | 465 | 704 |
| 6-1 | $2CaO.MgO.2SiO_2.0.1B_2O_3.Eu_{0.004}Ce_{0.0015}$ | 317 | 572 |
| 6-2 | $2CaO.MgO.2SiO_2.0.1B_2O_3.Eu_{0.004}Ce_{0.05}$ | 354 | 643 |
| 7-1 | $2CaO.MgO.2SiO_2.0.1B_2O_3.Eu_{0.004}Sn_{0.001}$ | 397 | 845 |
| 7-2 | $2CaO.MgO.2SiO_2.0.1B_2O_3.Eu_{0.004}Sn_{0.004}$ | 492 | 897 |
| 8-1 | $2CaO.MgO.2SiO_2.0.1B_2O_3.Eu_{0.004}Bi_{0.001}$ | 426 | 823 |
| 8-2 | $2CaO.MgO.2SiO_2.0.1B_2O_3.Eu_{0.004}Bi_{0.04}$ | 549 | 864 |
| 9-1 | $2CaO.MgO.2SiO_2.0.1B_2O_3.Eu_{0.004}Dy_{0.02}Nd_{0.01}$ | 965 | 1534 |
| 10-1 | $2CaO.MgO.2SiO_2.0.1B_2O_3.Eu_{0.004}Dy_{0.02}Bi_{0.01}$ | 873 | 1424 |
| Comparative sample | (ZnCd)S:Cu | 100 | 100 |

The experimental phosphor can display yellow afterglow luminescence after irradiated under sunlight, fluorescent lamp or ultraviolet lamp; when excited under 365 nm ultraviolet light the phosphor can give 420–650 nm wide band emission spectrum, peak value at 535 nm; its excitation spectrum is broad band spectrum between 250–500 nm when monitoring at 535 nm, indicates this phosphor has strong absorbing ability to short wavelength light; its main matrix compound is defined as $Ca_2MgSi_2O_7$; Due to the different adding components, its spectrum peak position can be shifted certain displacement. FIG. 5(a), (b) and FIG. 6 are the emission spectrum, excitation spectrum and x-ray diffraction pattern of the experimental phosphor 2-3 respectively, its emission spectrum peak position is at 535 nm.

1. If y=0 in the chemical composition formula, the amount of Eu(x) added can has certain influence to the afterglow intensity, see the experiment 1-1~7 in TABLE 5.

Figure 7:
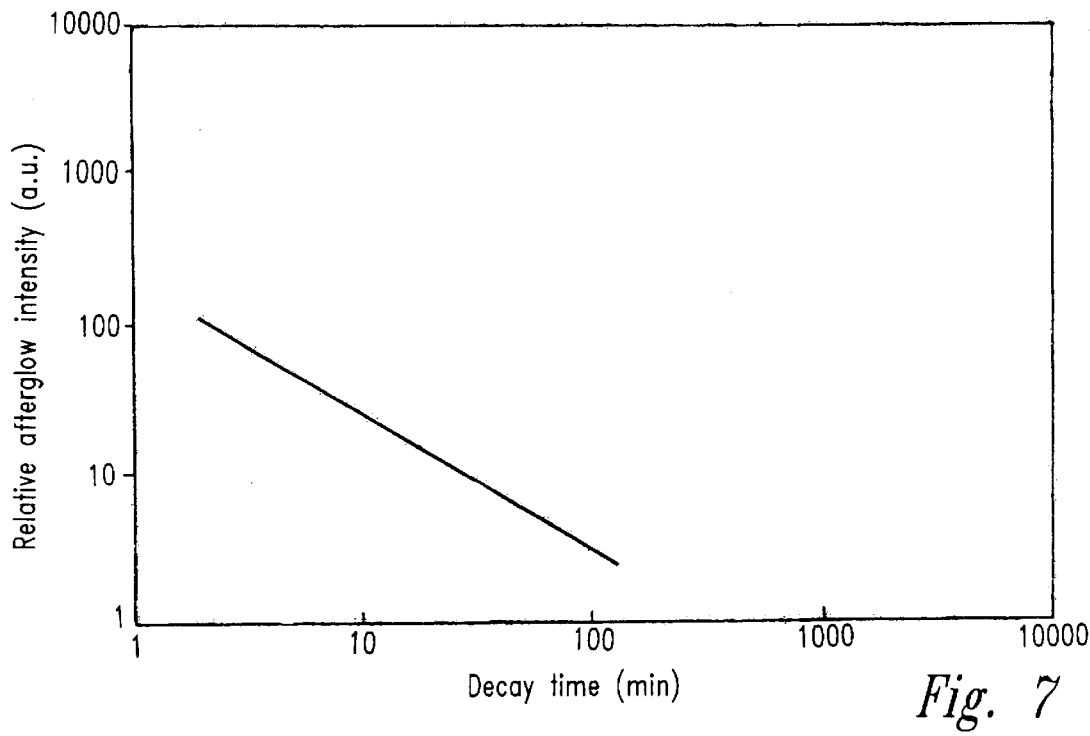
FIG. 7 represents the afterglow characteristic curve of $Ca_2MgSi_2O_7$:Eu,Dy phosphor

2. If x=0.004, Ln=Dy, the relationship between the amount of Dy(y) added and the afterglow effect shown in TABLE 5 of experiment 2-1~4, it can be seen that the adding of Dy enhance the phosphor's luminescent performance, experiment indicate that $0.0001 \leq y \leq 0.2$ are better for the amount of Dy added, FIG. 7 is log—log characteristic curve of experiment 2-3 phosphor's luminescent afterglow changes with the decay time.

3. If x=0.004, Ln is Nd, Ho, Tm, Ce, Sn, Bi and double Dy, Nd and Dy, Bi respectively, the relationship between the adding amount and afterglow effect are superior to that of comparative sample. According to the above phosphor's main compound, the chemical formula of the yellow series phosphor is $Ca_2MgSi_2O_7$:Eu,Ln.

(3) Green long afterglow luminescent material

When M=$Sr_{0.5}Ca_{0.5}$, m'=Mg, R=$B_2O_3$, a=2, b=1, c=2, d=0.05, the chemical composition formula is: $2(Sr_{0.5}Ca_{0.5})O \cdot MgO \cdot 2SiO_2 \cdot 0.05B_2O_3$: $Eu_x Ln_y$, change the value of x, the elements of Ln, and the value of y, its experimental results shown in TABLE 6.

TABLE 6

| Experiment | Chemical composition formula | Relative afterglow intensity | |
|---|---|---|---|
| | | 10' | 60' |
| 1-1 | $2(Sr_{0.5}Ca_{0.5})O \cdot MgO \cdot 2SiO_2 \cdot 0.05B_2O_3:Eu_{0.005}$ | 89.5 | 226.3 |
| 1-2 | $2(Sr_{0.5}Ca_{0.5})O \cdot MgO \cdot 2SiO_2 \cdot 0.05B_2O_3:Eu_{0.001}$ | 105.3 | 247.4 |
| 1-3 | $2(Sr_{0.5}Ca_{0.5})O \cdot MgO \cdot 2SiO_2 \cdot 0.05B_2O_3:Eu_{0.004}$ | 89.5 | 323 |
| 1-4 | $2(Sr_{0.5}Ca_{0.5})O \cdot MgO \cdot 2SiO_2 \cdot 0.05B_2O_3:Eu_{0.01}$ | 52.6 | 215 |
| 1-5 | $2(Sr_{0.5}Ca_{0.5})O \cdot MgO \cdot 2SiO_2 \cdot 0.05B_2O_3:Eu_{0.02}$ | 42.1 | 110.5 |
| 1-6 | $2(Sr_{0.5}Ca_{0.5})O \cdot MgO \cdot 2SiO_2 \cdot 0.05B_2O_3:Eu_{0.1}$ | 21 | 57.9 |
| 2-1 | $2(Sr_{0.5}Ca_{0.5})O \cdot MgO \cdot 2SiO_2 \cdot 0.05B_2O_3:Eu_{0.005}Dy_{0.0005}$ | 562 | 1515 |
| 2-2 | $2(Sr_{0.3}Ca_{0.5})O \cdot MgO \cdot 2SiO_2 \cdot 0.05B_2O_3:Eu_{0.005}Dy_{0.004}$ | 1237 | 3333 |
| 2-3 | $2(Sr_{0.5}Ca_{0.5})O \cdot MgO \cdot 2SiO_2 \cdot 0.05B_2O_3:Eu_{0.005}Dy_{0.008}$ | 1206 | 3158 |
| 2-4 | $2(Sr_{0.5}Ca_{0.5})O \cdot MgO \cdot 2SiO_2 \cdot 0.05B_2O_3:Eu_{0.005}Dy_{0.04}$ | 1246 | 3421 |
| 2-5 | $2(Sr_{0.5}Ca_{0.5})O \cdot MgO \cdot 2SiO_2 \cdot 0.05B_2O_3:Eu_{0.005}Dy_{0.08}$ | 1219 | 3591 |
| 3-1 | $2(Sr_{0.5}Ca_{0.5})O \cdot MgO \cdot 2SiO_2 \cdot 0.05B_2O_3:Eu_{0.005}Nd_{0.0064}$ | 1127 | 2815 |
| 3-2 | $2(Sr_{0.5}Ca_{0.5})O \cdot MgO \cdot 2SiO_2 \cdot 0.05B_2O_3:Eu_{0.005}Nd_{0.008}$ | 1212 | 3032 |
| 3-3 | $2(Sr_{0.5}Ca_{0.5})O \cdot MgO \cdot 2SiO_2 \cdot 0.05B_2O_3:Eu_{0.005}Nd_{0.16}$ | 1146 | 3012 |
| 4-1 | $2(Sr_{0.5}Ca_{0.5})O \cdot MgO \cdot 2SiO_2 \cdot 0.05B_2O_3:Eu_{0.005}Ho_{0.01}$ | 472 | 1324 |
| 4-2 | $2(Sr_{0.5}Ca_{0.5})O \cdot MgO \cdot 2SiO_2 \cdot 0.05B_2O_3:Eu_{0.005}Ho_{0.05}$ | 534 | 1427 |
| 5-1 | $2(Sr_{0.5}Ca_{0.5})O \cdot MgO \cdot 2SiO_2 \cdot 0.05B_2O_3:Eu_{0.005}Tm_{0.01}$ | 567 | 1624 |
| 5-2 | $2(Sr_{0.5}Ca_{0.5})O \cdot MgO \cdot 2SiO_2 \cdot 0.05B_2O_3:Eu_{0.005}Tm_{0.05}$ | 621 | 1735 |
| 6-1 | $2(Sr_{0.5}Ca_{0.5})O \cdot MgO \cdot 2SiO_2 \cdot 0.05B_2O_3:Eu_{0.005}Ce_{0.0015}$ | 116 | 184 |
| 6-2 | $2(Sr_{0.5}Ca_{0.5})O \cdot MgO \cdot 2SiO_2 \cdot 0.05B_2O_3:Eu_{0.005}Ce_{0.006}$ | 95 | 174 |
| 6-3 | $2(Sr_{0.5}Ca_{0.5})O \cdot MgO \cdot 2SiO_2 \cdot 0.05B_2O_3:Eu_{0.005}Ce_{0.02}$ | 116 | 216 |
| 7-1 | $2(Sr_{0.5}Ca_{0.5})O \cdot MgO \cdot 2SiO_2 \cdot 0.05B_2O_3:Eu_{0.005}Sn_{0.001}$ | 118 | 267 |
| 7-2 | $2(Sr_{0.5}Ca_{0.5})O \cdot MgO \cdot 2SiO_2 \cdot 0.05B_2O_3:Eu_{0.005}Sn_{0.005}$ | 234 | 349 |
| 7-3 | $2(Sr_{0.5}Ca_{0.5})O \cdot MgO \cdot 2SiO_2 \cdot 0.05B_2O_3:Eu_{0.005}Sn_{0.02}$ | 121 | 254 |
| 8-1 | $2(Sr_{0.5}Ca_{0.5})O \cdot MgO \cdot 2SiO_2 \cdot 0.05B_2O_3:Eu_{0.005}Tb_{0.0013}$ | 89.5 | 231.6 |
| 8-2 | $2(Sr_{0.5}Ca_{0.5})O \cdot MgO \cdot 2SiO_2 \cdot 0.05B_2O_3:Eu_{0.005}Tb_{0.0053}$ | 94.7 | 242 |
| 8-3 | $2(Sr_{0.5}Ca_{0.5})O \cdot MgO \cdot 2SiO_2 \cdot 0.05B_2O_3:Eu_{0.005}Tb_{0.021}$ | 31.6 | 368 |
| 9-1 | $2(Sr_{0.5}Ca_{0.5})O \cdot MgO \cdot 2SiO_2 \cdot 0.05B_2O_3:Eu_{0.005}Pr_{0.0015}$ | 52.6 | 136.8 |
| 9-2 | $2(Sr_{0.5}Ca_{0.5})O \cdot MgO \cdot 2SiO_2 \cdot 0.05B_2O_3:Eu_{0.005}Pr_{0.006}$ | 73.7 | 194.7 |
| 9-3 | $2(Sr_{0.5}Ca_{0.5})O \cdot MgO \cdot 2SiO_2 \cdot 0.05B_2O_3:Eu_{0.005}Pr_{0.023}$ | 89.5 | 226.3 |
| 10-1 | $2(Sr_{0.5}Ca_{0.5})O \cdot MgO \cdot 2SiO_2 \cdot 0.05B_2O_3:Eu_{0.005}Bi_{0.001}$ | 154 | 317 |
| 10-2 | $2(Sr_{0.5}Ca_{0.5})O \cdot MgO \cdot 2SiO_2 \cdot 0.05B_2O_3:Eu_{0005}Bi_{0.005}$ | 282 | 431 |
| 10-3 | $2(Sr_{0.5}Ca_{0.5})O \cdot MgO \cdot 2SiO_2 \cdot 0.05B_2O_3:Eu_{0.005}Bi_{0.02}$ | 297 | 442 |
| 11-1 | $2(Sr_{0.5}Ca_{0.5})O \cdot MgO \cdot 2SiO_3 \cdot 0.05B_2O_3:Eu_{0.005}Dy_{0.02}Bi_{0.01}$ | 2042 | 4127 |
| Comparative sample | ZnS:Cu | 100 | 100 |

Figure 8:
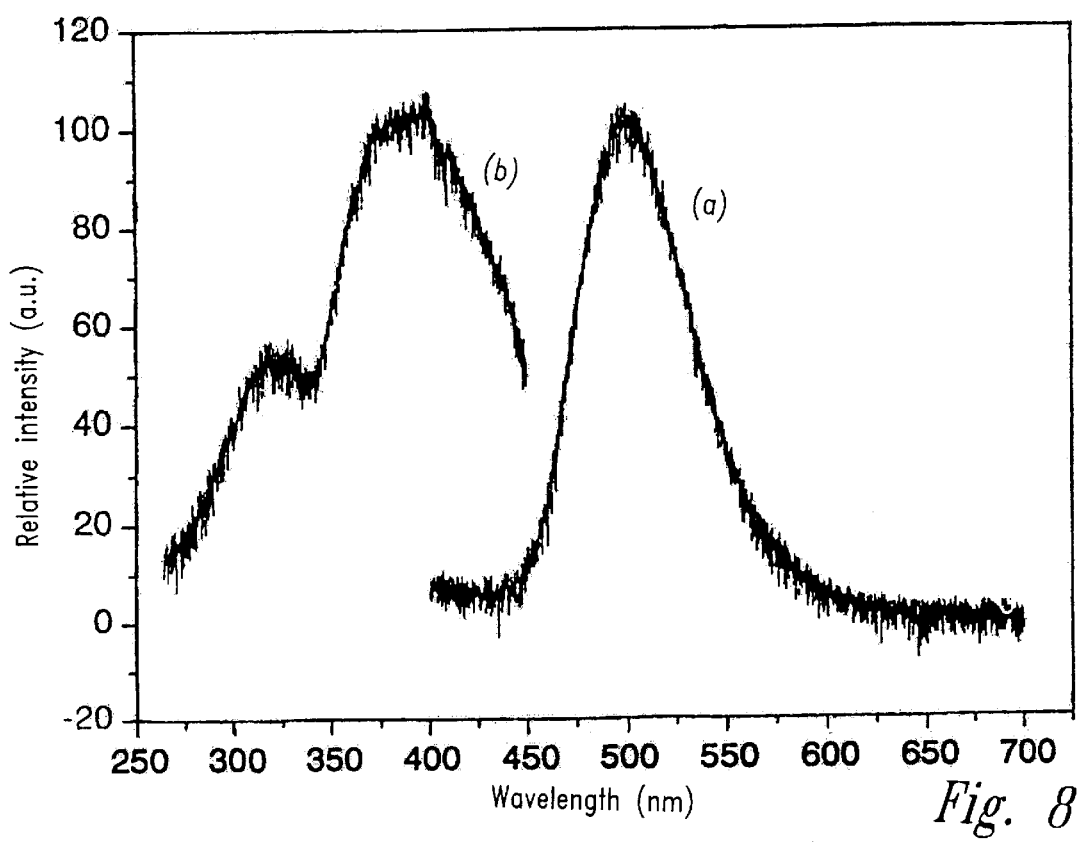
FIG. 8 represents the emission spectrum(a) and the excitation spectrum(b) of $(Sr_{0.5}Ca_{0.5})_2MgSi_2O_7$:Eu,Dy phosphor
Figure 9:
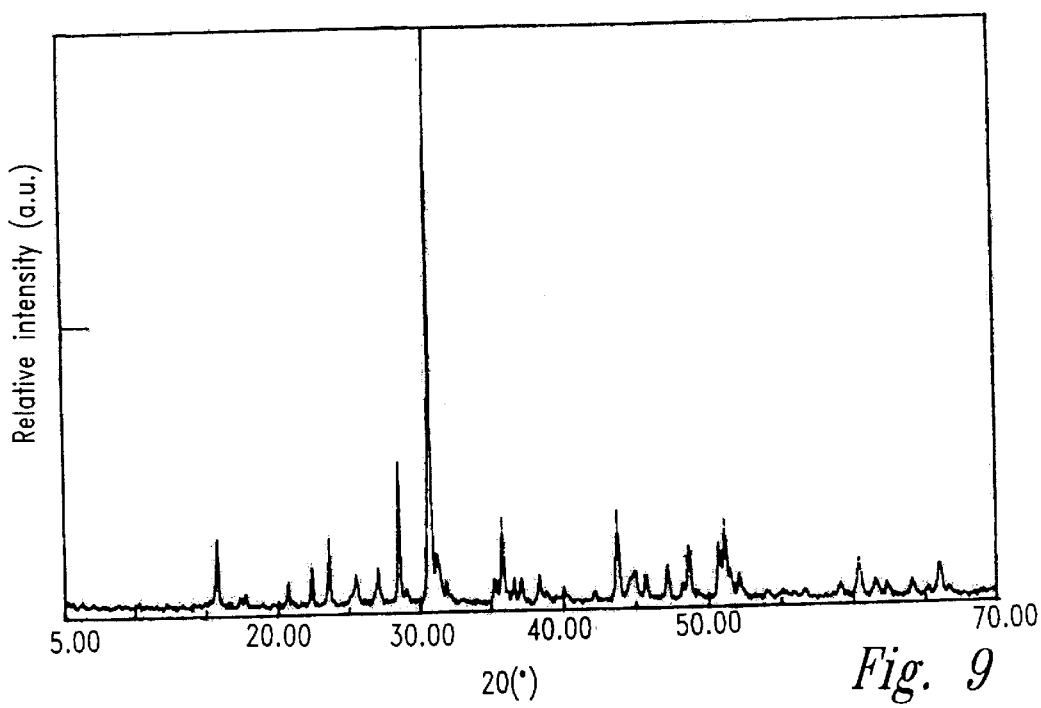
FIG. 9 represents the x-ray diffraction pattern of $(Sr_{0.5}Ca_{0.5})_2MgSi_2O_7$:Eu,Dy phosphor

The experimental phosphor in TABLE 6 can display green afterglow luminescence after irradiated under sunlight, fluorescent lamp or ultraviolet lamp; when excited under 365 nm ultraviolet light, the phosphor can give 430–600 nm broad band emission spectrum, peak position near 500 nm; its excitation spectrum is broad band spectrum between 250–460 nm, when monitoring at 500 nm, indicated that this phosphor has stronger absorption ability for the short wave light; analyzed from x-ray diffraction patterns, it can be seen that this phosphor diffraction patterns is similar to that of $Sr_2MgSi_2O_7$ and $Ca_2MgSi_2O_7$, concerning the mole proportion of Sr and Ca, the main matrix compound $(Sr_{0.5}Ca_{0.5})_2MgSi_2O_7$ can be deduced. For different addings, its peak position of spectrum can be shifted certain. FIG. 8(a), (b) and FIG. 9 are emission spectrum, excitation spectrum and x-ray diffraction pattern of experimental phosphor2-5 respectively, its emission spectrum peak position is 500 nm.

1. If y=0 in the chemical composition formula, the relationship between the amount of Eu(x) added and afterglow intensity, see experiment 1-1~6 in TABLE 6.

Figure 10:
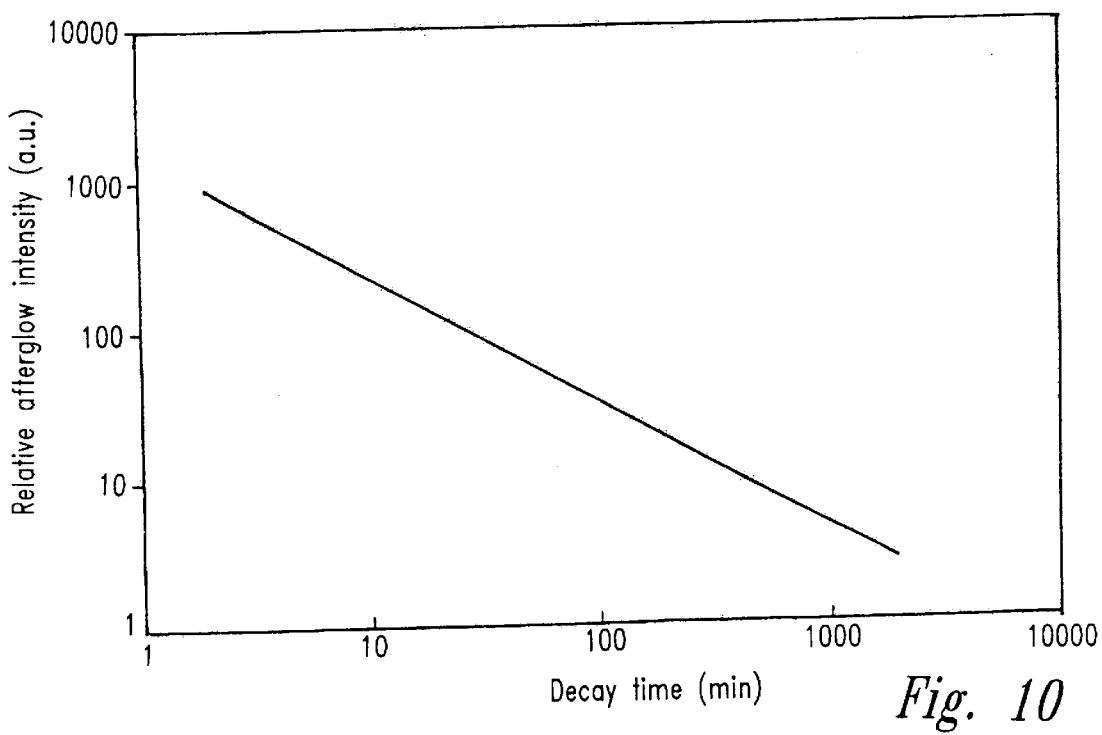
FIG. 10 represents the afterglow characteristic curve of $(Sr_{0.5}Ca_{0.5})_2MgSi_2O_7$:Eu,Dy phosphor

2. If x=0.005, Ln=Dy, the relationship between the amount of Dy(y) and afterglow effect, see experiment 2-1~6 in TABLE 6. IT can be seen that this phosphor has obviously strengthened in afterglow intensity compared with the phosphor of experiment 1-1~6. FIG. 10 is the log—log characteristic curve concerning luminescent afterglow of phosphor in experiment 2-5 varies with the decay time, it indicates that the decay time can prolong to more than 50 hrs when afterglow brightness reach the eye's lowest visual luminosity 0.32 mcd/m².

3. If x=0.005, Ln=Nd, the relationship between the amount of Nd(y) added and the afterglow effect, see experiment 3-1~3 in TABLE 6, it can be seen that afterglow intensity is higher and decay time is longer.

4. If x=0.005, Ln is Ho, Tm, Ce, Sn, Tb, Pr and Bi respectively, the influence of its adding amount to the afterglow intensity, see experiment 4-10 in TABLE 6.

5. If x=0.005, Ln=Dy and Bi, if Dy and Bi are both added in the same time, then obvious enhancement of luminescent afterglow intensity can be seen, see experiment 11 in TABLE 6.

According to the main compound of above phosphor, the chemical formula of the green series phosphor is: $(Sr_{0.5}C_{0.5})_2MgSi_2O_7:Eu,Ln$.

(4) Bluish-green to greenish-yellow long afterglow luminescent material s

When $M=Sr_{1-z}Ca_z$, M'=Mg, $R=B_2O_3$, a=2, b=1, c=2, d=0.1, the phosphor's chemical composition formula is:

$2(Sr_{1-z}Ca_z)O \cdot MgO \cdot 2SiO_2 \cdot 0.1B_2O_3:Eu_x,Ln_y$, $0 \leq z \leq 1$, the phosphors' afterglow colors change from blue to yellow the the z value, when z=0, the color is blue; z=1, which is yellow; z=0.5, which is green. The phosphors' luminescent colors present the change from blue to green then yellow with the change of z value from 0 to 1, that means to change the proportion of Sr and Ca.

1. As shown in TABLE 7, test the influence of the change of the proportion Sr and Ca in $2(Sr_{1-z}Ca_z)O \cdot MgO \cdot 2SiO_2 \cdot 0.1B_2O_3:Eu_{0.004},Dy_{0.02}$, to the emission spectrum peak position, it can be seen that the emission spectrum peak position changed from 469 nm to 535 nm varies as the z value changes from 0 to 1, this cause the luminescent color presents the change of blue, bluish-green, green, greenish-yellow and yellow, see TABLE 7.

TABLE 7

| Z | 0 | 0.1 | 0.2 | 0.3 | 0.4 | 0.5 | 0.6 | 0.7 | 0.8 | 0.9 | 1 |
|---|---|---|---|---|---|---|---|---|---|---|---|
| Sr | Sr | $Sr_{0.9}$ | $Sr_{0.8}$ | $Sr_{0.7}$ | $Sr_{0.6}$ | $Sr_{0.5}$ | $Sr_{0.4}$ | $Sr_{0.3}$ | $Sr_{0.2}$ | $Sr_{0.1}$ | 0 |
| Ca | 0 | $Ca_{0.1}$ | $Ca_{0.2}$ | $Ca_{0.3}$ | $Ca_{0.4}$ | $Ca_{0.5}$ | $Ca_{0.6}$ | $Ca_{0.7}$ | $Ca_{0.8}$ | $Ca_{0.9}$ | Ca |
| Emission spectra peak, nm | 469 | 473 | 482 | 485 | 496 | 500 | 505 | 509 | 517 | 532 | 535 |

Figure 11:
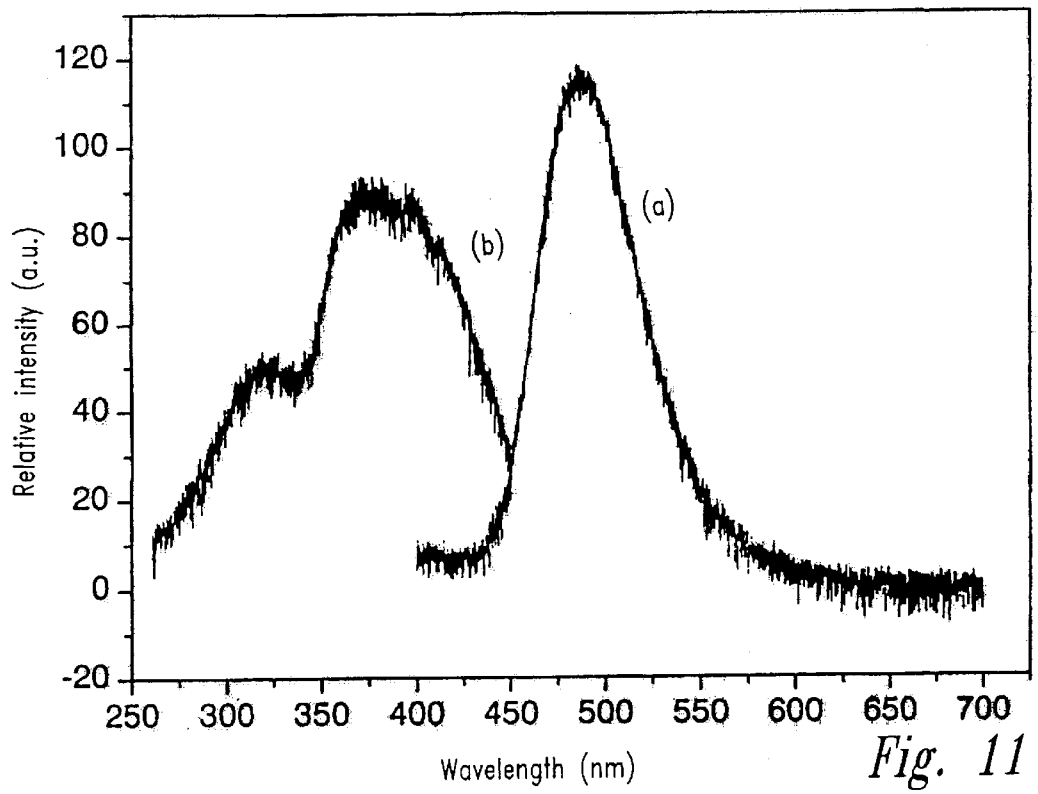
FIG. 11 represents the emission spectrum(a) and the excitation spectrum(b) of $(Sr_{0.75}Ca_{0.25})_2MgSi_2O_7$:Eu,Dy phosphor

2. When z=0.25, select chemical composition formula $2(Sr_{0.75}Ca_{0.25})O \cdot MgO \cdot 2SiO_2 \cdot 0.1B_2O_3:Eu_{0.004},Ln_{0.02}$ to do experiment, shown as experiment 1~6 in TABLE 8, the phosphors present bluish-green long afterglow luminescence and the adding of Ln ion can obviously strengthen its luminescent intensity as shown from experiment 2 in TABLE 8, there is a sharp difference compared with the comparative sample, a very strong bluish-green afterglow luminescence can be presented, and its emission spectrum, excitation spectrum are shown in FIG. 11(a),(b).

Figure 12:
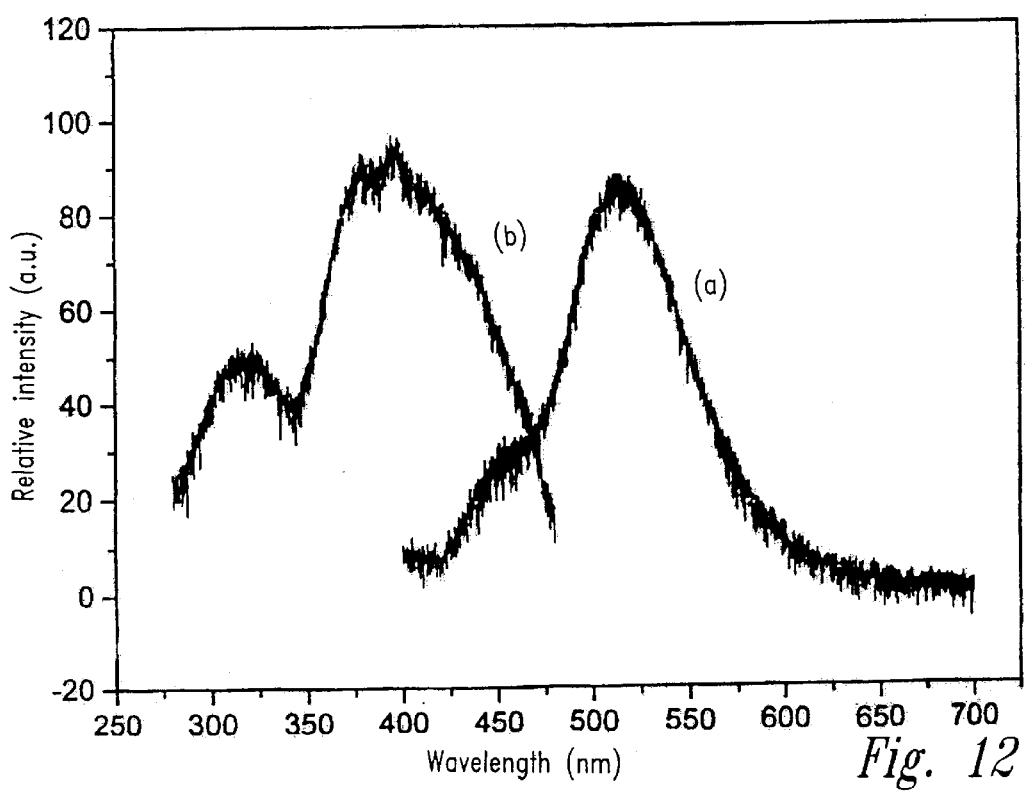
FIG. 12 represents the emission spectrum(a) and the excitation spectrum(b) of $(Sr_{0.25}Ca_{0.75})_2MgSi_2O_7$:Eu,Dy phosphor

3. When z=0.75, select chemical composition formula $2(Sr_{0.75}Ca_{0.75})O \cdot MgO \cdot 2SiO_2 \cdot 0.1B_2O_3:Eu_{0.004},Ln_{0.02}$ as seen in experiment 7-12 of TABLE 8, the phosphors present greenish-yellow long afterglow luminescence, and the adding of Ln ion can obviously strengthen its luminescent intensity, which can be seen from experiment 8 in TABLE 8, there in an obvious enhancement compared with the comparative sample, its emission spectrum, excitation spectrum are shown FIG. 12(a),(b).

Figure 13:
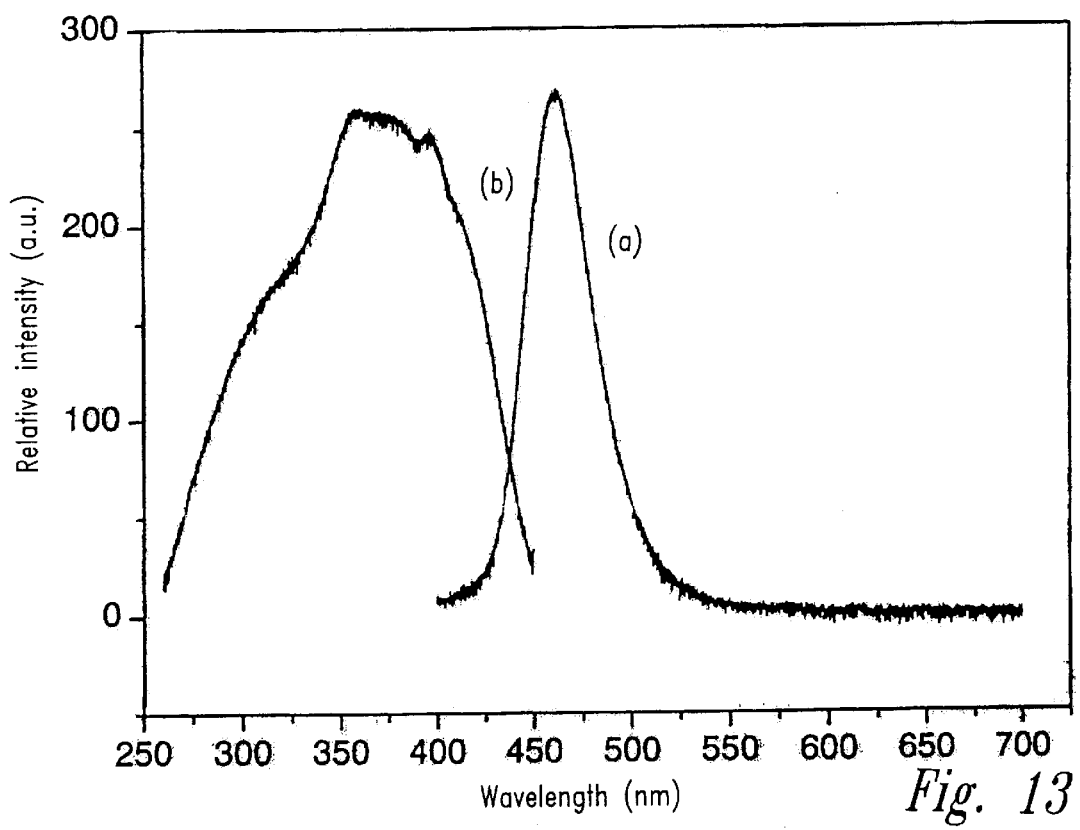
FIG. 13 represents the emission spectrum(a) and the excitation spectrum(b) of $Sr_3MgSi_2O_7$:Eu,Dy phosphor

In TABLE 9, M=Sr, Ln=Dy or Nd was selected in experiment 1, the phosphors display blue long afterglow. The emission spectrum, excitation spectrum and x-ray diffraction pattern of $3SrO \cdot MgO \cdot 2SiO_2 \cdot 0.1B_2O_3:Eu_{0.004}$, $Dy_{0.02}$ phosphor are shown in FIG. 13(a),(b) and FIG. 14 respectively. The peak of the emission spectrum is 462 nm. The dominant compound is $Sr_3MgSi_2O_8$, and the secondary is $Sr_2MgSi_2O_7$, The chemical formula of the phosphor $Sr_3MgSi_2O_8:Eu,Ln$ is defined.

Figure 15:
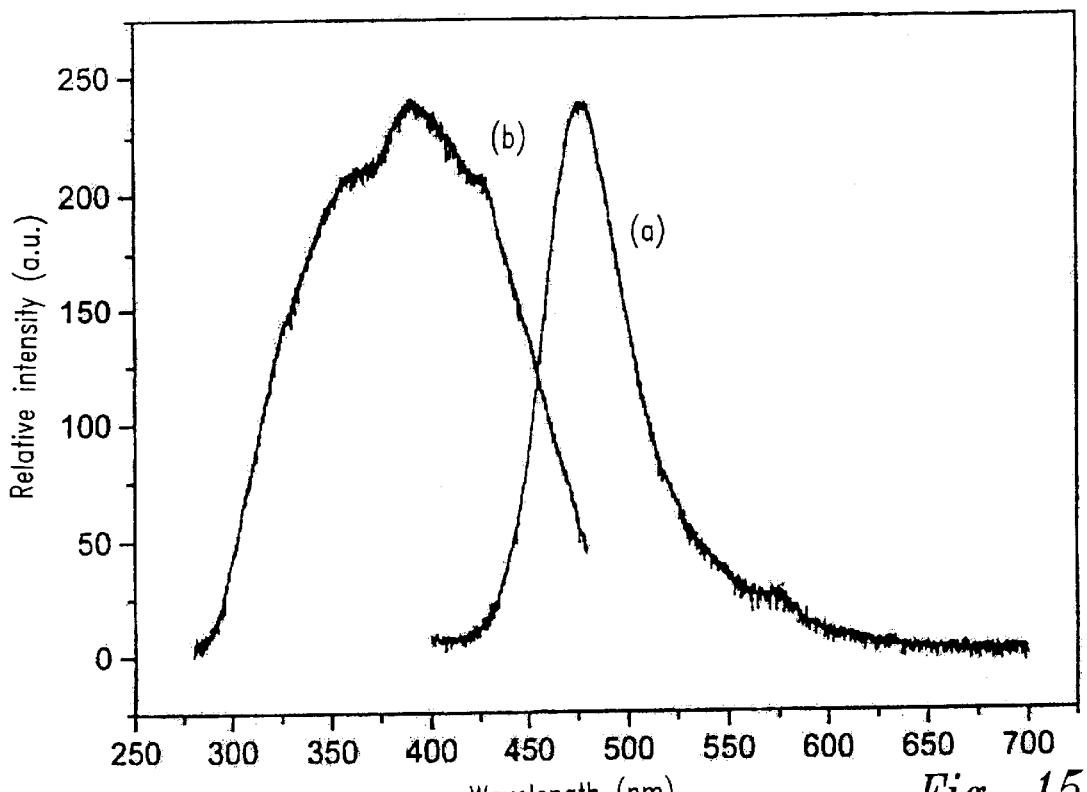
FIG. 15 represents the emission spectrum(a) and the excitation spectrum(b) of $Ca_3MgSi_2O_8$:Eu,Dy phosphor

In TABLE 9, M=Ca, Ln=Dy or Nd was selected in the experiment 2, the phosphors display light green long afterglow. The emission spectrum, excitation spectrum and x-ray diffraction pattern of the $3CaO \cdot MgO\ 2SiO_2:Eu_{0.04},Dy_{0.02}$ phosphor are shown in FIG. 15(a), (b) and FIG. 16 respectively and the peak of the emission spectrum is 475 nm. The dominant compound is $Ca_3MgSi_2O_8$, and the secondary is $Ca_3MgSi_2O_7$.

When $M=Sr_{0.5}Ca_{0.5},Ln=Dy$ or Nd, the phosphors display bluish-green afterglow. The long afterglow property of them is shown in the experiment 3-1~2 of TABLE 9.

TABLE 8

| | | Relative afterglow intensity | | Luminescent |
|---|---|---|---|---|
| Ex. | Chemical composition formula | 10' | 60' | color |
| 1 | $2(Sr_{0.75}Ca_{0.25})O.MgO.2SiO_2.0.01B_2O_3:Eu_{0.01}$ | 121 | 162 | bluish-green |
| 2 | $2(Sr_{0.75}Ca_{0.25})O.MgO.2SiO_2.0.01B_2O_3:Eu_{0.01}Dy_{0.02}$ | 1758 | 3874 | bluish-green |
| 3 | $2(Sr_{0.75}Ca_{0.25})O.MgO.2SiO_2.0.01B_2O_3:Eu_{0.01}Nd_{0.02}$ | 1121 | 1671 | bluish-green |
| 4 | $2(Sr_{0.75}Ca_{0.25})O.MgO.2SiO_2.0.01B_2O_3:Eu_{0.01}Ho_{0.02}$ | 1023 | 1642 | bluish-green |
| 5 | $2(Sr_{0.75}Ca_{0.25})O.MgO.2SiO_2.0.01B_2O_3:Eu_{0.01}Sn_{0.02}$ | 267 | 342 | bluish-green |
| 6 | $2(Sr_{0.75}Ca_{0.25})O.MgO.2SiO_2.0.01B_2O_3:Eu_{0.01}Bi_{0.02}$ | 323 | 407 | bluish-green |
| 7 | $2(Sr_{0.75}Ca_{0.25})O.MgO.2SiO_2.0.01B_2O_3:Eu_{0.01}$ | 171 | 303 | greenish-yellow |
| 8 | $2(Sr_{0.75}Ca_{0.25})O.MgO.2SiO_2.0.01B_2O_3:Eu_{0.01}Dy_{0.02}$ | 617 | 1247 | greenish-yellow |
| 9 | $2(Sr_{0.75}Ca_{0.25})O.MgO.2SiO_2.0.01B_2O_3:Eu_{0.01}Nd_{0.02}$ | 517 | 928 | greenish-yellow |
| 10 | $2(Sr_{0.75}Ca_{0.25})O.MgO.2SiO_2.0.01B_2O_3:Eu_{0.01}Ho_{0.02}$ | 361 | 808 | greenish-yellow |
| 11 | $2(Sr_{0.75}Ca_{0.25})O.MgO.2SiO_2.0.01B_2O_3:Eu_{0.01}Sn_{0.02}$ | 231 | 431 | greenish-yellow |
| 12 | $2(Sr_{0.75}Ca_{0.25})O.MgO.2SiO_2.0.01B_2O_3:Eu_{0.01}Bi_{0.02}$ | 272 | 489 | greenish-yellow |

(5) Other long afterglow luminescent materials

1. In the chemical composition formula, when $M=Sr_{1-z}Ca_z$, wherein $0 \leq z \leq 1$, M'=Mg, $R=B_2O_3$, a=3, b=1, c=2, d=0.1, that means the formula is $3MO \cdot MgO \cdot 2SiO_2 \cdot 0.1B_2O_3:Eu_x,Ln_y$, the phosphors display long luminescence from blue to greenish-yellow.

TABLE 9

| Experiment | Chemical composition formula | Relative afterglow intensity 10' | 60' | Luminescent color |
|---|---|---|---|---|
| 1-1 | $3SrO \cdot MgO \cdot 2SiO_2 \cdot 0.1B_2O_3:Eu_{0.004}Nd_{0.02}$ | 211 | 489 | blue |
| 1-2 | $3SrO \cdot MgO \cdot 2SiO_2 \cdot 0.1B_2O_3:Eu_{0.004}Dy_{0.02}$ | 300 | 579 | blue |
| 2-1 | $3CaO \cdot MgO \cdot 2SiO_2 \cdot 0.1B_2O_3:Eu_{0.004}Nd_{0.02}$ | 31.4 | 56.1 | light green |
| 2-2 | $3CaO \cdot MgO \cdot 2SiO_2 \cdot 0.1B_2O_3:Eu_{0.004}Dy_{0.02}$ | 67.1 | 146 | light green |
| 3-1 | $3(Sr_{0.5}Ca_{0.5})O \cdot MgO \cdot 2SiO_2 \cdot 0.1B_2O_3:Eu_{0.004}Dy_{0.02}$ | 173 | 345 | bluish-green |
| 3-2 | $3(Sr_{0.5}Ca_{0.5})O \cdot MgO \cdot 2SiO_2 \cdot 0.1B_2O_3:Eu_{0.004}Nd_{0.02}$ | 91 | 183 | bluish-green |
| Comparative samples | (CaSr)S:Bi | 100 | 100 | |
| | ZnS:Cu | 100 | 100 | |

2. In the chemical composition formula, when M is $Sr_{1-z}Ca_z$, where $0 \leq z \leq 1$, M' is Mg, 0–40% mol of M and/or M' can be partly taken the place by one or more elements from a group consisting of Ba, Zn, Cd, and Be, then the colors of the afterglow are blue, green, yellow etc.

The afterglow colors of the phosphors, in which M mainly consists of Sr, are from blue to blue-green, that is shown in the experiment of 1-1~4 of TABLE 10, the long afterglow property of them is compared with (CaSr)S:Bi; if M mainly consists of Ca or Sr and Ca, the afterlow colors of the phosphors are from green to yellow, that is indicated in the experiment 2-1~4 and 3-1~2 of TABLE 10. The long afterglow property of them is compared with (ZnCd)S:Cu and ZnS:Cu respectively. It is obvious that the long afterglow property of these phosphor is much more superior than that of the comparative samples.

TABLE 10

| Experiment | Chemical composition formula | Relative afterglow intensity 10' | 60' |
|---|---|---|---|
| 1-1 | $2(Sr_{0.9}Zn_{0.1})O \cdot MgO \cdot 2SiO_2 \cdot 0.1B_2O_3:Eu_{0.004}Dy_{0.02}$ | 976 | 1793 |
| 1-2 | $2SrO \cdot (Mg_{0.9}Zn_{0.1})O \cdot 2SiO_2 \cdot 0.1B_2O_3:Eu_{0.004}Nd_{0.02}$ | 1170 | 2104 |
| 1-3 | $2SrO \cdot (Mg_{0.9}Ba_{0.1})O \cdot 2SiO_2 \cdot 0.1B_2O_3:Eu_{0.004}Dy_{0.02}$ | 836 | 1706 |
| 1-4 | $2(Sr_{0.9}Cd_{0.1})O \cdot MgO \cdot 2SiO_2 \cdot 0.1B_2O_3:Eu_{0.004}Dy_{0.02}$ | 1031 | 1842 |
| 2-1 | $2(Ca_{0.9}Zn_{0.1})O \cdot MgO \cdot 2SiO_2 \cdot 0.1B_2O_3:Eu_{0.004}Dy_{0.02}$ | 635 | 784 |
| 2-2 | $2CaO \cdot (Mg_{0.9}Zn_{0.1})O \cdot 2SiO_2 \cdot 0.1B_2O_3:Eu_{0.004}Dy_{0.02}$ | 703 | 802 |
| 2-3 | $2(Ca_{0.95}Ba_{0.05})O \cdot MgO \cdot 2SiO_2 \cdot 0.1B_2O_3:Eu_{0.004}Nd_{0.02}$ | 507 | 769 |
| 2-4 | $2CaO \cdot (Mg_{0.9}Be_{0.1})O \cdot 2SiO_2 \cdot 0.1B_2O_3:Eu_{0.004}Dy_{0.02}$ | 603 | 726 |
| 3-1 | $2(Sr_{0.495}Ca_{0.495}Zn_{0.05})O \cdot MgO \cdot 2SiO_2 \cdot 0.1B_2O_3:Eu_{0.004}Dy_{0.02}$ | 1083 | 2835 |
| 3-2 | $2Sr_{0.5}Ca_{0.5})O \cdot (Mg_{0.9}Ba_{0.1})O \cdot 2SiO_2 \cdot 0.1B_2O_3:Eu_{0.004}Dy_{0.02}$ | 1017 | 2786 |
| Comparative samples | (CaSr)S:Bi | 100 | 100 |
| | (ZnCd)S:Cu | 100 | 100 |
| | ZnS:Cu | 100 | 100 |

Figure 17:
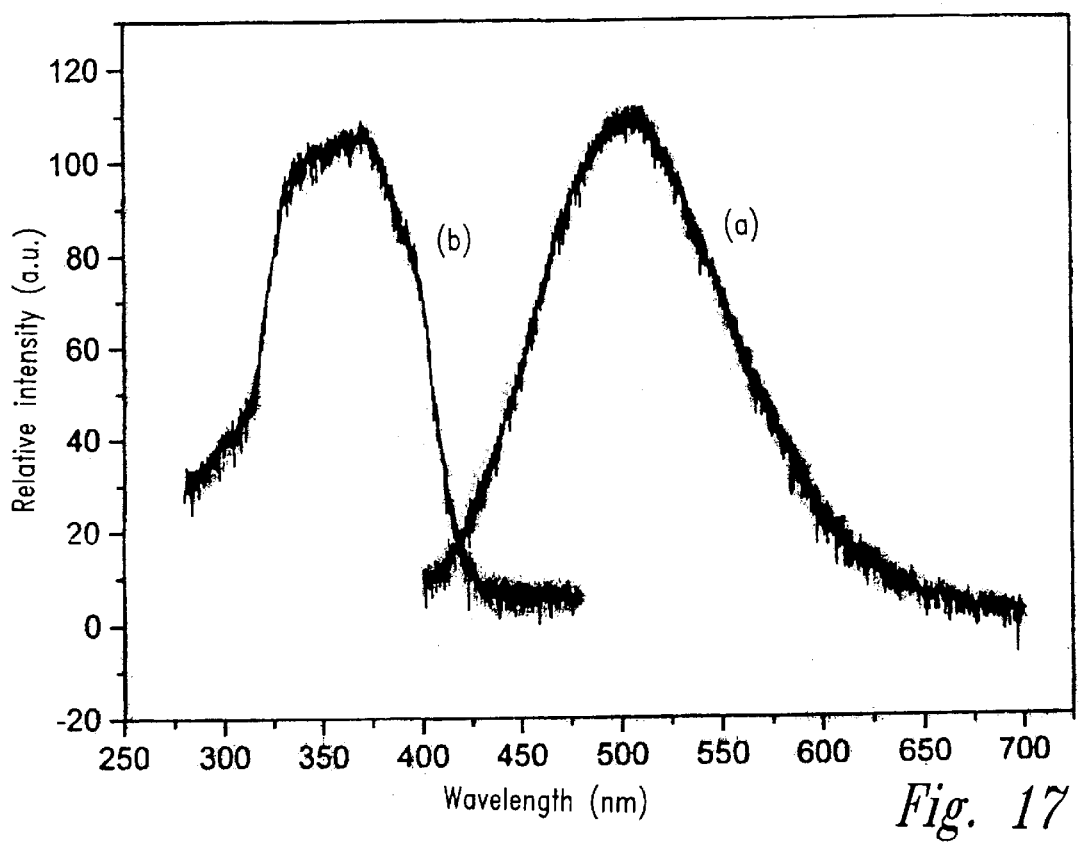
FIG. 17 represents the emission spectrum(a) and the excitation spectrum(b) of $Ba_5Si_8O_{21}$:Eu,Dy phosphor

3. When M=Ba, a=5, b=0, c=8, $R=B_2O_3$, d=0.1, the formula of the phosphors is $5BaO \cdot 8SiO_2 \cdot 0.1B_2O_3:Eu_x,Ln_y$, the synthesized phosphor, in which x=0.01, Ln=Dy, y=0.02 shows light green luminescence, and the dominant compound is $Ba_5Si_8O_{31}$, the emission spectrum and excitation spectrum are shown in FIG. 17(a), (b), TABLE 11 shows its relative persistence property. Ba being party replaced by one or more elements from a group consisting of Ca, Sr, Mg, Zn, Cd and Be, the phosphors display persistence luminescence too.

TABLE 11

| Experiment | Chemical composition formula | Relative afterglow intensity 10' | 60' |
|---|---|---|---|
| 1-1 | $Ba_5Si_8O_{31}:Eu,Dy$ | 87.4 | 100 |
| comparative sample | ZnS:Cu | 100 | 100 |

4. When M=Zn, $R=B_2O_3$, a=2, b=0, c=1, d=0.1, Ln=Dy and Mn, x=0.01, y=0.02, the synthesized phosphor shows light green afterglow and the main compound is $Zn_2SiO_4$. The decay property is shown in TABLE 12. Zn being partly replaced by one or more elements from a group consisting of Ca, Sr, Mg, Ba, Cd and Be the phosphor shows decay luminescence too.

TABLE 12

| Experiment | Chemical composition formula | Relative afterglow intensity 10' | 60' |
|---|---|---|---|
| 1-1 | $Zn_2SiO_4:Eu,Dy,Mn$ | 32.6 | 95.8 |
| Comparative sample | ZnS:Cu | 100 | 100 |

In this invention it is also found that put other additives (0–15% weight of the raw material) to the raw material can more or less improve the long afterglow intensity of phosphor and the quality of the synthesized product, but didn't change its dominant crystal structure and main compound, the influence of the additives on the afterglow property of the greenish-yellow phosphors is indicated in TABLE 13.

In TABLE 13 the greenish-yellow phosphor is selected wherein $M=Sr_{0.3}Ca_{0.7}, M'=M, R=B_3O_3, Ln=Dy, a=2.5, b=1.2, c=2.5, d=0.1, x=0.02, y=0.1$

TABLE 13

| Ex. | Chemical composition formula | Added compound | Mol | Relative afterglow intensity 10' | 60' |
|---|---|---|---|---|---|
| 1 | $2.5(Sr_{0.3}Ca_{0.7}O).1.2MgO.2.5SiO_2.0.1B_2O_3:Eu_{0.02}Dy_{0.1}$ | 0 | 0 | 643 | 1374 |
| 2 | $2.5(Sr_{0.3}Ca_{0.7}O).1.2MgO.2.5SiO_2.0.1B_2O_3:Eu_{0.02}Dy_{0.1}$ | $NH_4Cl$ | 0.1 | 684 | 1427 |
| 3 | $2.5(Sr_{0.3}Ca_{0.7}O).1.2MgO.2.5SiO_2.0.1B_2O_3:Eu_{0.02}Dy_{0.1}$ | $NH_4F$ | 0.1 | 672 | 1395 |
| 4 | $2.5(Sr_{0.3}Ca_{0.7}O).1.2MgO.2.5SiO_2.0.1B_2O_3:Eu_{0.02}Dy_{0.1}$ | $Li_2CO_3$ | 0.05 | 693 | 1432 |
| 5 | $2.5(Sr_{0.3}Ca_{0.7}O).1.2MgO.2.5SiO_2.0.1B_2O_3:Eu_{0.02}Dy_{0.1}$ | $SrF_2$ | 0.1 | 675 | 1398 |
| 6 | $2.5(Sr_{0.3}Ca_{0.7}O).1.2MgO.2.5SiO_2.0.1B_2O_3:Eu_{0.02}Dy_{0.1}$ | $CaF_2$ | 0.1 | 663 | 1388 |
| 7 | $2.5(Sr_{0.3}Ca_{0.7}O).1.2MgO.2.5SiO_2.0.1B_2O_3:Eu_{0.02}Dy_{0.1}$ | $CaSO_4$ | 0.1 | 670 | 1391 |
| 8 | $2.5(Sr_{0.3}Ca_{0.7}O).1.2MgO.2.5SiO_2.0.1B_2O_3:Eu_{0.02}Dy_{0.1}$ | $SrSO_4$ | 0.1 | 675 | 1382 |
| 9 | $2.5(Sr_{0.3}Ca_{0.7}O).1.2MgO.2.5SiO_2.0.1B_2O_3:Eu_{0.02}Dy_{0.1}$ | $SrHPO_4$ | 0.1 | 682 | 1407 |
| 10 | $2.5(Sr_{0.3}Ca_{0.7}O).1.2MgO.2.5SiO_2.0.1B_2O_3:Eu_{0.02}Dy_{0.1}$ | $CaHPO_4$ | 0.1 | 667 | 1379 |

In other chemical formula more or less influence of these additives on the afterglow property is found as well.

The phosphors of this invention have good water resistance property and better stability. In the same condition, putting the long afterglow phosphor of aluminate and along afterglow silicate phosphor of this invention into water respectively it is found that the aluminate's phosphor decomposed after three days and decomposed entirely after a week and losing the luminescent property, but the silicate's phosphor didn't decompose even after three months. The afterglow property still existed.

This invention have the following outstanding features compared with the present technology:

(1) Inventing a new series of long afterglow phosphors with silicate as the dominant host lattice that possesses the fairly good chemical stability and water resistance property, and changeable afterglow colors: bluish-green, green, greenish-yellow and yellow.

(2) Inventing of some ions can enhance the luminescence of the $Eu^{2+}$ and improve the afterglow luminescent properties.

(3) Adding of boron and phosphors compound can make further improvement on the luminescent properties.

The invention is described in detail hereafter by referring to the examples and figures.

EXAMPLES

Example 1

$2SrO·MgO·2SiO_2·0.1B_2O_3:Eu_{0.004}$ phosphor's synthesis and analysis results Match of the raw materials:

| Element | Mol | Raw Material | Weight |
|---|---|---|---|
| Sr | 1.996 | $SrCO_3$ | 294.6 g |
| Mg | 1 | $4MgCO_3.Mg(OH)_2.5H_2O$ | 97.1 g |
| Si | 2 | $SiO_2$ | 120 g |

-continued

| Element | Mol | Raw Material | Weight |
|---|---|---|---|
| B | 0.2 | $B_2O_3$ | 6.96 g |
| Eu | 0.004 | $Eu_2O_3$ | 0.704 g |

The above raw material was ground into fine and mixed homogeneously, then placed in alumina crucible and fired in the furnace which full of $Nh_3(g)$ atmosphere at 1350° C. for 3 hrs, after that cooled down and smashed the fired phosphor, finally sifted it out by the sieve of 100 mesh.

The appearance of this phosphor is greyish white, after irradiated under sun light it can present blue afterglow color in dark; measured the phosphor's luminescent afterglow intensity, show in experiment 1-4 in TABLE 4, FIG. 1 (a), (b) and FIG. 2 are the example phosphor's emission spectrum, excitation spectrum and x-ray diffraction pattern respectively, according to its x-ray diffraction pattern, its crystal structure, is akermanite and its compound is $Sr_2MgSi_2O_7$, the phosphor's chemical formula $Sr_2MgSi_2O_7:Eu$ is defined.

Example 2

$2SrO·MgO·2SiO_2·0.1B_2O_3:Eu_{0.04},Dy_{0.04}$ phosphor's synthesis and analysis results Match of the raw materials:

| Element | Mol | Raw Material | Weight |
|---|---|---|---|
| Sr | 1.96 | $SrCO_3$ | 289.3 g |
| Mg | 0.996 | $4MgCO_3.Mg(OH)_2.5H_2O$ | 96.7 g |
| Si | 2 | $SiO_2$ | 120 g |
| B | 0.2 | $H_2BO_3$ | 13.56 g |
| Eu | 0.004 | $Eu_2O_3$ | 0.704 g |
| Dy | 0.04 | $Dy_2O_3$ | 7.46 g |

The above raw material is ground into fine and mixed homogeneously in alcohol solution, after baking, placed in alumina crucible, and fired in a high temperature furnace which full of $NH_3(g)$ atmosphere at 1350° C. for 3 hrs, after that cooled down, smashed the fired phosphor, finally sifted it out by the sieve of 100 mesh.

The appearance of this phosphor is greyish white, after irradiated under fluorescent lamp, it displays very strong blue afterglow in dark, the phosphor's relative luminescent intensity shown as experiment 3-4 in TABLE4, its intensity is obviously higher than that of example 1; besides, the material's afterglow time is long, see FIG. 7; FIG. 3(a)(b) are phosphor's emission spectrum and excitation spectrum respectively; the phosphor's crystal structure and main compound same as example 1, the phosphor's chemical formula $Sr_2MgSi_2O_7$:Eu, Dy is defined.

Example 3

$SrO·3MgO·2SiO_2·0.05P_2O_5$:$Du_{0.004}$,$Nd_{0.01}$
phosphor's synthesis

Match of the raw materials:

| Element | Mol | Raw Material | Weight |
|---|---|---|---|
| Sr | 0.993 | $SrCO_3$ | 146.6 g |
| Mg | 2.993 | $4MgCO_3·Mg(OH)_2·5H_2O$ | 290.6 g |
| Si | 2 | $SiO_2$ | 120 g |
| P | 0.1 | $(NH_4)_2HPO_4$ | 13.2 g |
| Eu | 0.004 | $Eu_2O_3$ | 0.704 g |
| Nd | 0.1 | $Nd_2O_3$ | 1.68 g |

The above raw material is ground into fine and mixed homogeneously in acetone solution, after baking, placed in alumina crucible, and fired in a furnace which full of $H_2(g)$ atmosphere at 1350° C. for 3 hrs, after that cooled and smashed the fired phosphor, finally sifted it out by the sieve of 100 mesh.

This phosphor can display stronger blue afterglow after irradiated under ultraviolet lamp, analyzed from x-ray diffraction pattern, its dominant compound is $Sr_2MgSiO_7$ and $Mg_2SiO_4$, the phosphor's chemical composition formula $SrO·3MgO·2SiO_2·0.05P_2O_5$Eu,Nd is defined.

Example 4

$2CaO·MgO·2SiO_2·0.15B_2O_3$:$Eu_{0.04}$,$Dy_{0.05}$
phosphor's synthesis and analysis results Match of the raw materials:

| Element | Mol | Raw Material | Weight |
|---|---|---|---|
| Ca | 1.946 | $CaCO_3$ | 194.6 g |
| Mg | 1 | $4MgCO_3·Mg(OH)_2·5H_2O$ | 97.1 g |
| Si | 2 | $SiO_2$ | 120 g |
| B | 0.3 | $H_3BO_3$ | 18.84 g |
| Eu | 0.004 | $Eu_2O_3$ | 0.764 g |
| Dy | 0.05 | $Dy_2O_3$ | 9.325 g |

The above raw material is ground into fine and mixed homogeneously, then placed in alumina crucible fired in a high temperature furnace which full of 30% $H_2(g)$+70% $N_2(g)$ atmosphere at 1320° C. for 5 hrs, after that cooled and smashed the fired phosphor, finally sifted it out by the sieve of 100 mesh.

Figure 5:
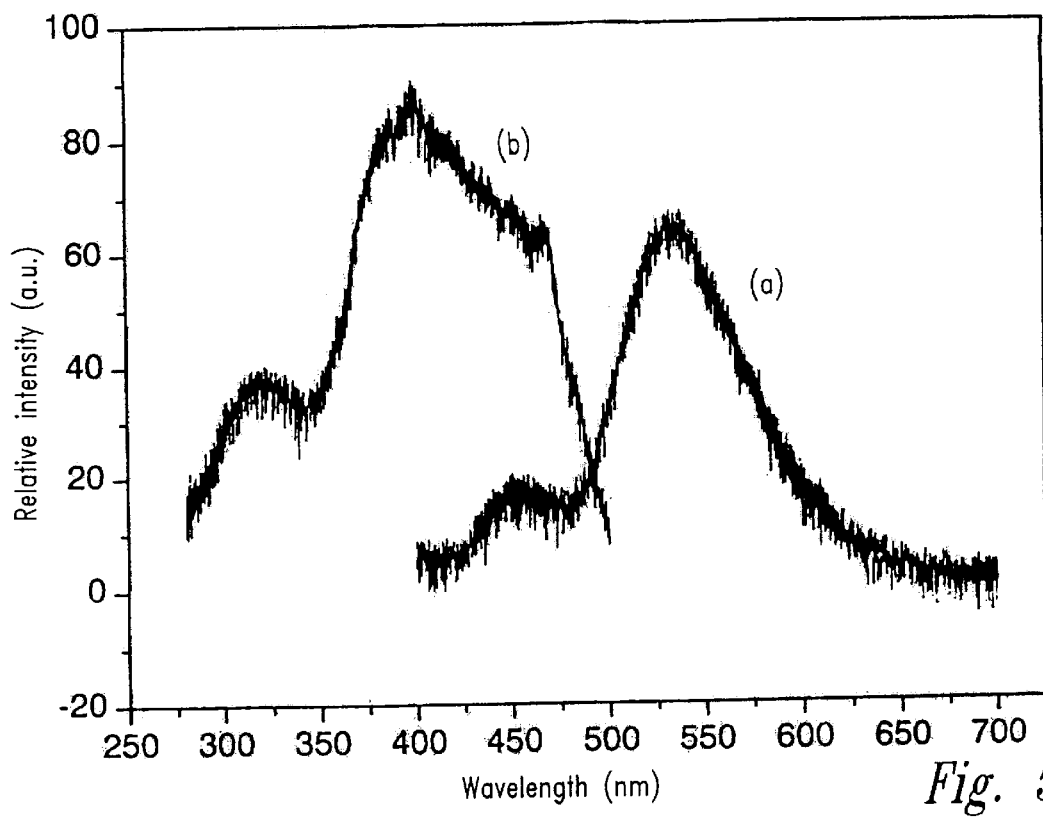
FIG. 5 represents the emission spectrum(a) and the excitation spectrum(b) of $Ca_2MgSi_2O_7$:Eu,Dy phosphor
Figure 6:
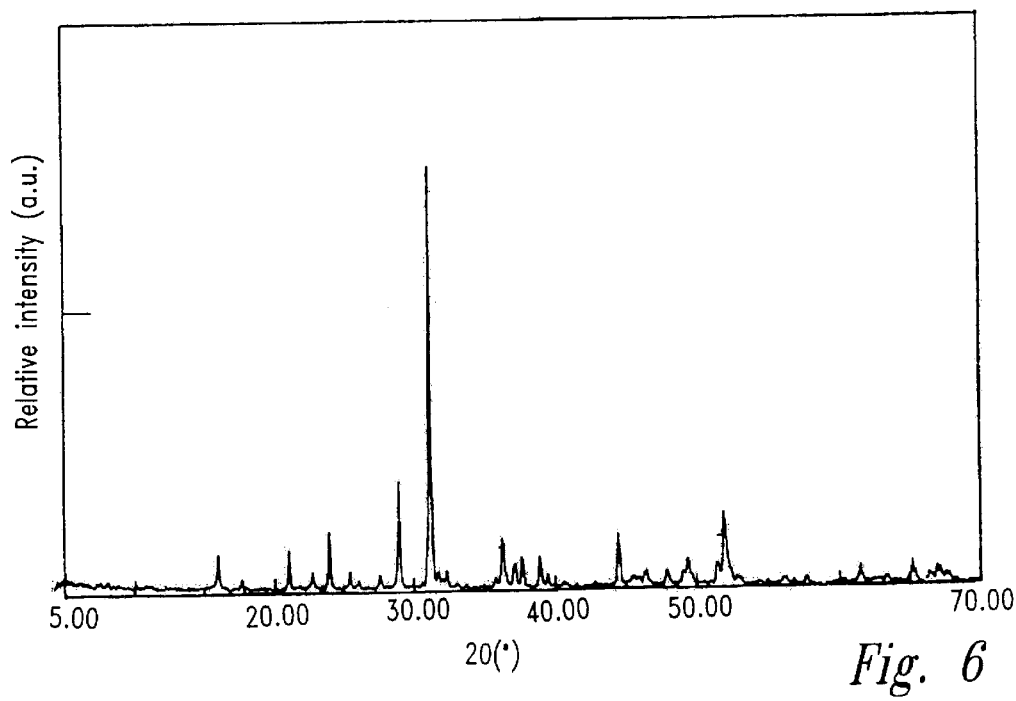
FIG. 6 represents the x-ray diffraction pattern of $Ca_2MgSi_2O_7$:Eu,Dy phosphor

The appearance of this phosphor is light yellow, after irradiated under fluorescent lamp, it can presents very strong yellow afterglow in dark; the phosphor's relative luminescent intensity shown as experiment 2-3 in TABLE 5, which is obviously stronger than that of experiment 1-4 in TABLE 5, its emission spectrum, excitation spectrum are shown in FIG. 5 (a),(b); the phosphor's afterglow time is long, FIG. 7 is phosphor's afterglow characteristic curve, the phosphor's main crystal structure is akermanite and its compound is $Ca_2MgSi_2O_7$, see FIG. 6, so the phosphor's chemical formula is defined as $Ca_2MgSi_2O_7$:Eu,Dy.

Example 5

$1.5CaO·3MgO·2SiO_2·0.15B_2O_3$:$Eu_{0.04}$,$Ho_{0.08}$
phosphor's synthesis

Match of the raw materials:

| Element | Mol | Raw Material | Weight |
|---|---|---|---|
| Ca | 1.5 | $CaCO_3$ | 150 g |
| Mg | 3 | $4MgCO_3·Mg(OH)_2·5H_2O$ | 291.3 g |
| Si | 2 | $H_2SiO_3$ | 156 g |
| B | 0.15 | $B_2O_3$ | 10.44 g |
| Eu | 0.004 | $Eu_2O_3$ | 0.704 g |
| Ho | 0.08 | $Ho_2O_3$ | 15.1 g |

The synthesis method of this phosphor is the same as example 1, after irradiated under ultraviolet lamp, this phosphor displays yellow afterglow, according to the x-ray diffraction pattern, its compounds is $Ca_2MgSi_2O_7$, $CaMgSiO_4$ and $Ca_3Si_{23}O_7$ so the phosphor's chemical composition formula $1.5CaO·3MgO·2SiO_2·0.15B_2O_3$Eu,Ho is defined.

Example 6

$2(Sr_{0.5}Ca_{0.5})O·MgO·2SiO_2·0.05B_2O_3$:$Eu_{0.005}$,$Dy_{0.08}$
phosphor's syntheses and analysis results Match of the raw materials:

| Element | Mol | Raw Material | Weight |
|---|---|---|---|
| Sr | 1 | $SrCO_3$ | 147.6 g |
| Ca | 1 | $CaCO_3$ | 100 g |
| Mg | 1 | $4MgCO_3·Mg(OH)_2·5H_2O$ | 97.1 g |
| Si | 2 | $SiO_2$ | 120 g |
| B | 0.1 | $H_3BO_3$ | 6.28 g |
| Eu | 0.005 | $Eu_2O_3$ | 0.88 g |
| Dy | 0.08 | $Dy_2O_3$ | 14.92 g |

The above raw material is ground and mixed homogeneously, placed in alumina crucible, fired for 3 hrs at 1300° C. in $NH_3(g)$ atmosphere, after that cooled down and smashed the fired phosphor, finally sifted it out by the sieve of 100 mesh.

The appearance of this phosphor is light green, after irradiated under fluorescent lamp it displays strong green afterglow. This phosphor's relative afterglow intensity is shown in TABLE 6. The emission spectrum, excitation spectrum and x-ray diffraction pattern of this phosphor are shown in FIG. 8(a),(b) and FIG. 9 respectively. The phosphor's afterglow time is long and FIG. 10 is the afterglow characteristics curve. Its chemical formula $(Sr_{0.5}Ca_{0.5})_2MgSi_2O_7$:Eu,Dy is defined.

Example 7

$2(Sr_{0.25}Ca_{0.75})O \cdot MgO \cdot 2.3SiO_2 \cdot 0.05P_2O_5:Eu_{0.01},$
$Nd_{0.02}$ phosphor's synthesis Match of the raw material:

| Element | Mol | Raw Material | Weight |
|---|---|---|---|
| Sr | 0.5 | $Sr(NO_3)_2$ | 105.8 g |
| Ca | 1.5 | $Ca(NO_3)_2 \cdot 4H_2O$ | 354 g |
| Mg | 1 | $Mg(NO_3)_2 \cdot 6H_2O$ | 256.4 g |
| Si | 2.3 | silica gel | 138 g |
| P | 0.1 | $NH_4H_2PO_4$ | 11.5 g |
| Eu | 0.01 | $Eu_2O_3$ | 1.76 g |
| Nd | 0.02 | $Nd_2O_3$ | 3.36 g |

The synthesis method of this phosphor is the same as described in example 1.

This phosphor displays greenish-yellow afterglow after irradiated under fluorescent lamp. The x-ray diffraction pattern of this phosphor is similar to FIG. 9, so it can be deduced that its compound is $(Sr_{0.25}Ca_{0.75})_2MgSi_2O_7$, its chemical formula $(Sr_{0.25}Ca_{0.75})_2MgSi_2O_7:Eu,Nd$. is defined.

Example 8

$3SrO \cdot MgO \cdot 2SiO_2:Eu_{0.001}Ho_{0.08}$ phosphor's synthesis

Match of the raw material:

| Element | Mol | Raw Material | Weight |
|---|---|---|---|
| Sr | 3 | $Sr(NO_3)_2$ | 634.8 g |
| Mg | 1 | MgO | 40.3 g |
| Si | 2 | $H_2SiO_3$ | 156 g |
| Eu | 0.01 | $Eu_2O_3$ | 1.76 g |
| Ho | 0.08 | $Ho_2O_3$ | 15.1 g |

The synthesis method of this phosphor is the same as described in example 1.

This phosphor displays blue afterglow after irradiated under sunlight, its dominant compound is $Sr_3MgSi_2O_8$, the secondary is $Sr_2MgSi_2O_7$, so the chemical formula $Sr_3MgSi_2O_8:Eu,Ho$ is defined.

Example 9

$2(Sr_{0.6}Ca_{0.4})O \cdot (Mg_{0.8}Cd_{0.2})$
$O \cdot 2.5SiO_2 \cdot 0.01B_2O_3:Eu_{0.001}\ Dy_{0.02}Bi_{0.01}$
phosphor's synthesis Match of the raw material:

| Element | Mol | Raw Material | Weight |
|---|---|---|---|
| Sr | 1.3 | $SrCO_3$ | 177.1 g |
| Ca | 0.8 | $CaCO_3$ | 80 g |
| Mg | 0.8 | $4MgCO_3 \cdot Mg(OH)_2 \cdot 5H_2O$ | 77.7 g |
| Cd | 0.2 | CdO | 25.7 g |
| Si | 2.5 | $SiO_2$ | 150 g |
| B | 0.2 | $B_2O_3$ | 6.96 g |
| Eu | 0.01 | $Eu_2O_3$ | 1.76 g |

-continued

| Element | Mol | Raw Material | Weight |
|---|---|---|---|
| Dy | 0.02 | $Dy_2O_3$ | 3.73 g |
| Bi | 0.01 | $Bi_2O_3$ | 2.33 g |

Doped 5% $NH_4Cl$ by weight of the raw material, grinding and mixing them together, then firing them as example 1.

The fired phosphor displays strong bluish-green afterglow after irradiated under sunlight.

Example 10

$5BaO \cdot 8SiO_2 \cdot 0.1B_2O_3:Eu_{0.01}Dy_{0.02}$ phosphor's synthesis

Match of the raw material:

| Element | Mol | Raw Material | Weight |
|---|---|---|---|
| Ba | 5 | $BaCO_3$ | 985 g |
| Si | 8 | $SiO_3$ | 480 g |
| B | 0.2 | $B_2O_3$ | 6.96 g |
| Eu | 0.01 | $Eu_2O_3$ | 1.76 g |
| Dy | 0.02 | $Dy_2O_3$ | 3.73 g |

The synthesis method of this phosphor is the same described in example 1, after irradiated under sunlight this phosphor displays light green persistence, its compound is $Ba_5Si_8)_{21}$ and so the chemical formula $Ba_5Si_8O_{21}:Eu,Dy$ is defined.

INDUSTRIAL APPLICATION

The products in this invention can be widely used in all kinds of long afterglow products as indicators or ornaments in dark environment, combined with paint; plastics; printing ink; rubber etc., this series of luminescent materials has good effect in architecture, traffic, decoration, watch and clock dials, fishing tackles, toys and other goods for daily use, it's specially suitable for the production of long afterglow safety products, such as warning, mandatory and escape-route signs.

What is claimed is:

1. A long afterglow luminescent material, comprising silicates with activators, wherein said luminescent material has a chemical composition of:

$aMO \cdot bM'O \cdot bM'O \cdot cSiO_2 \cdot dR:Eu_x,Ln_y$, wherein

M represents one or more elements selected from the group consisting of Sr, Ca, Ba and Zn;

M' represents one or more elements selected from the group consisting of Mg, Cd and Be;

R represents one or two components selected from $B_2O_3$ and $P_2O_5$;

Ln represents one or more elements selected from the group consisting of Nd, Dy, Ho, Tm, La, Pr, Tb, Ce, Mn, Bi, Sn and Sb; and wherein a, b, c, d, x, and y represent mole coefficients, wherein $0.6 \leq a \leq 6$, $0 \leq b \leq 5$, $1 \leq c \leq 9$, $0 \leq d \leq 0.7$, $0.00001 \leq x \leq 0.2$, and $0 < y \leq 0.3$; with the proviso that when Ln includes Bi, Mn or Sn, $d \neq 0$; and said luminescent material is capable of emitting an emission spectrum ranging from 420 nm to 650 nm when excited by short wavelength light ranging from 250 nm to 500 nm, with a peak position of the emission spectrum ranging from 450 nm to 580 nm, and wherein the long afterglow luminescent color of said luminescent material is blue, bluish-green, green, greenish-yellow or yellow.

2. The long afterglow luminescent material of claim 1, wherein M represents one or two elements selected from Sr and Ca; M' represents Mg; R represent one or two components selected from $B_2O_3$ and $P_2O_5$; Ln represents one or more elements selected from the group consisting of Nd, Dy, Ho, Bi and Sn, wherein $0.6 \leq a \leq 4$, $0.6 \leq b \leq 4$, $1 \leq c \leq 5$, and $0 \leq d \leq 0.4$.

3. The long afterglow luminescent material of claim 2, wherein 0–40% mole of the elements M and/or M' have been replaced by one or more elements selected from the group consisting of Ba, Zn, Cd and Be.

4. The long afterglow luminescent material of claim 1, wherein said luminescent material has a chemical composition of:

$M_2MgSi_2O_7:Eu_x, Ln_y$ or $M_3MgSi_2O_8:Eu_x, Ln_y$, wherein $0.00001 \leq x \leq 2$, $0 < y \leq 0.3$;

M represents $Sr_{1-Z}Ca_Z$; and

Ln represents one or more elements selected from the group consisting of Nd, Dy, Ho, Tm, La, Pr, Tb, Ce and Sb.

5. The long afterglow luminescent material of claim 1, wherein said luminescent material has a chemical composition of:

$Ba_5Si_8O_{21}dR:Eu_x,Ln_y$, wherein

R represents one or two components selected from $B_2O_3$ and $P_2O_5$; and wherein d, x and y represent mole coefficients, wherein $0 < d \leq 7$, $0.00001 \leq x \leq 0.2$, and $0 < y \leq 0.3$.

6. The long afterglow luminescent material of claim 1, wherein said luminescent material has a chemical composition of:

$Zn_2SiO_4dR:Eu_x,Dy_y,Mn_y$, wherein

R represents one or two components selected from $B_2O_3$ and $P_2O_5$; and wherein d, x and y represent mole coefficient, wherein $0 < d \leq 0.7$, $0.00001 \leq x \leq 0.2$, and $0 < y \leq 0.3$.

7. A method of manufacturing the long afterglow luminescent material of claim 1, wherein M, M', Ln and Eu are derived from raw materials individually selected from the group consisting of one or more of a carbonate, sulphate, nitrate, phosphate, borate, acetate, oxalate, citrate, oxide, hydroxide and halogenide, including mixtures thereof; and wherein Si is derived from $SiO_2$, silicic acid, silica gel or silicate;

R is derived from a compound containing B or P, with the proviso that such a compound can form $B_2O_3$ and $P_2O_5$ in a subsequent sintering procedure;

the method comprising the following steps:

weighing, groundong, and homogeneously mixing raw materials comprising M, M', Ln, Eu, Si and R to yield a mixture;

sintering the mixture at a temperature between 1100–1400° C. for a period of about 2 to 50 hours under a reducing atmosphere to yield a fired mixture;

milling and sifting the fired mixture into a desired particle size.

8. The method of manufacturing the long afterglow luminescent materials of claim 7, wherein the reducing atmosphere is selected from the group consisting of $H_2$, $NH_3$, and $N_2$ in combination with $H_2$.

9. The method of manufacturing the long afterglow luminescent material of claim 7, wherein $NH_4F$, $Li_2CO_3$, $SrF_2$, $CaF_2$, $CaSO_4$, $SrSO_4$, $SrHPO_4$, or $CaHPO_4$ has been added to the mixture to participate in a solid-phase reaction.

* * * * *